United States Patent
Fukumura et al.

(10) Patent No.: US 8,382,378 B2
(45) Date of Patent: Feb. 26, 2013

(54) WHEEL BEARING DEVICE

(75) Inventors: Yoshikazu Fukumura, Iwata (JP); Hisaaki Kura, Iwata (JP); Shin Tomogami, Iwata (JP); Hiroshi Kawamura, Iwata (JP); Kiyoshige Yamauchi, Iwata (JP); Masahiro Ozawa, Iwata (JP); Tohru Nakagawa, Iwata (JP); Yuichi Asano, Iwata (JP)

(73) Assignee: NTN Corporation, Osaka (JP)

( * ) Notice: Subject to any disclaimer, the term of this patent is extended or adjusted under 35 U.S.C. 154(b) by 835 days.

(21) Appl. No.: 12/520,931

(22) PCT Filed: Dec. 4, 2007

(86) PCT No.: PCT/JP2007/073361
§ 371 (c)(1),
(2), (4) Date: Jun. 23, 2009

(87) PCT Pub. No.: WO2008/078511
PCT Pub. Date: Jul. 3, 2008

(65) Prior Publication Data
US 2010/0021102 A1    Jan. 28, 2010

(30) Foreign Application Priority Data

Dec. 27, 2006 (JP) ................................. 2006-352786
Feb. 9, 2007 (JP) ................................. 2007-030692

(51) Int. Cl.
*F16C 13/00* (2006.01)
(52) U.S. Cl. ...................................... 384/544; 384/589
(58) Field of Classification Search .................. 384/544, 384/589; 403/359.1–359.6; 464/178, 182, 464/906
See application file for complete search history.

(56) References Cited

U.S. PATENT DOCUMENTS

| 5,213,437 | A  | * | 5/1993  | Sommer ....................... 403/359.6 |
| 6,497,515 | B1 | * | 12/2002 | Sahashi et al. ................. 384/544 |
| 2003/0146591 | A1 | | 8/2003 | Ouchi et al. |
| 2003/0210842 | A1 | | 11/2003 | Tajima et al. |
| 2004/0022468 | A1 | * | 2/2004 | Nomura et al. ................ 384/544 |

(Continued)

FOREIGN PATENT DOCUMENTS

| CN | 1453154 | 11/2003 |
| EP | 1 375 196 | 1/2004 |

(Continued)

OTHER PUBLICATIONS

International Preliminary Report on Patentability and Written Opinion of the International Searching Authority mailed Jul. 9, 2009 for International Application No. PCT/JP2007/073361.

(Continued)

*Primary Examiner* — Phillip A Johnson
(74) *Attorney, Agent, or Firm* — Wenderoth, Lind & Ponack, L.L.P.

(57) ABSTRACT

A wheel bearing device suppresses backlash in the circumferential direction and has excellent workability in connecting a hub wheel and an outer joint component of a constant velocity universal joint. The wheel bearing device has a stem shaft of an outer joint component of a constant velocity universal joint fitted into a hole section of a hub wheel that is integrated with the hub wheel by a projection and recess mating structure. In the projection and recess mating structure, an overall recess mating area of a projection is in close contact with a corresponding recess.

20 Claims, 10 Drawing Sheets

U.S. PATENT DOCUMENTS

| | | |
|---|---|---|
| 2004/0120622 A1 | 6/2004 | Tajima et al. |
| 2005/0159227 A1 | 7/2005 | Ouchi et al. |
| 2006/0189396 A1* | 8/2006 | Kozlowski et al. ............ 464/146 |
| 2007/0177939 A1* | 8/2007 | Kozlowski et al. ......... 403/359.1 |

FOREIGN PATENT DOCUMENTS

| | | |
|---|---|---|
| JP | 08-226426 | 9/1996 |
| JP | 2002-002211 | 1/2002 |
| JP | 2002-061660 | 2/2002 |
| JP | 2002-200902 | 7/2002 |
| JP | 2002-219903 | 8/2002 |
| JP | 2003-065347 | 3/2003 |
| JP | 2003-329047 | 11/2003 |
| JP | 2004-306692 | 11/2004 |
| JP | 2004-340311 | 12/2004 |
| JP | 2004-353724 | 12/2004 |
| JP | 2005-041311 | 2/2005 |
| JP | 2005-081868 | 3/2005 |
| JP | 2005-193757 | 7/2005 |
| JP | 2005-233402 | 9/2005 |
| JP | 2006-248373 | 9/2006 |
| JP | 2006-327289 | 12/2006 |
| JP | 2007-046703 | 2/2007 |
| JP | 2007-55322 | 3/2007 |
| JP | 2007-055503 | 3/2007 |
| JP | 2007-085372 | 4/2007 |
| WO | 2006/095603 | 9/2006 |
| WO | 2008/057498 | 5/2008 |

OTHER PUBLICATIONS

Statement Under PCT Article 19(1) filed May 23, 2008 for International Application No. PCT/JP2007/073361.

Chinese Office Action issued Jun. 12, 2010 in corresponding Chinese Application No. 200780043808.6 w/translation.

Supplementary European Search Report issued Mar. 14, 2011 in corresponding European Patent Application No. 07850011.3.

International Search Report mailed Mar. 18, 2008 for International Application No. PCT/JP2007/073361.

Japanese Office Action issued Aug. 6, 2012 in corresponding Japanese Patent Application No. 2007-030692 with partial English translation.

* cited by examiner

WHEEL BEARING DEVICE

TECHNICAL FIELD

The present invention relates to a wheel bearing device for supporting wheels of a vehicle, such as an automobile, to rotate freely in relation to a vehicle body.

BACKGROUND ART

Wheel bearing devices have developed from a structure referred to as a first generation that a double-row roller bearing singly, to a second generation in which a vehicle body attaching flange is integrated with an outer member, to a third generation in which an inner rolling contact surface is integrally formed on one roller bearing of a double-row roller bearing on an outer periphery of a hub wheel to which a wheel attaching flange is integrated, to a fourth generation in which a constant velocity universal joint is integrated with a hub wheel, and an inner rolling contact surface of the other roller bearing of the double-row roller bearing is integrally formed on an outer periphery of an outer joint component configuring the constant velocity universal joint.

For example, in Patent Document 1, a wheel bearing device referred to as the third generation is described. As shown in FIG. 13, the wheel bearing device referred to as the third generation includes a hub wheel 102, a constant velocity universal joint 104, and an outer member 105. The hub wheel 102 includes a flange 101 that extends in an outer diameter direction. An outer joint component 103 of the constant velocity universal joint 104 is fixed onto the hub wheel 102. The outer member 105 is disposed on an outer circumferential side of the hub wheel 102.

The constant velocity universal joint 104 includes the outer joint component 103, an inner joint component 108, a plurality of balls 109, and a cage 110. The inner joint component is disposed within a bowl-shaped section 107 of the outer joint component 103. The ball 109 is disposed between the inner joint component 108 and the outer joint component 103. The cage 110 holds the ball 109. A spline section 111 is formed on an inner circumferential surface of a center hole of the inner joint component 108. A spline section on an end section of a shaft (not shown) is inserted into the center hole. As a result, the spline section 111 on the inner joint component 108 side and the spline section on the shaft side are engaged.

The hub wheel 102 includes a cylinder section 113 and the flange 101. A short cylindrical pilot section 115 is provided such as to project from an outer end face 114 (an end face on a counter joint side) of the flange 101. A wheel and a brake rotor (not shown) are mounted on the pilot section 115. The pilot section 115 includes a large-diameter first section 115a and a small-diameter second section 115b. The brake rotor is fitted onto the first section 115a The wheel is fitted onto the second section 115b.

A small-diameter stepped section 116 is provided on an outer circumferential surface of an end section of the cylinder section 113 on the bowl-shaped section 107 side. An inner ring 117 is fitted onto the small-diameter stepped section 116. A first inner raceway surface 118 is provided near a flange on the outer circumferential side of the cylinder section 113 of the hub wheel 102. A second inner raceway surface 119 is provided on an outer circumferential surface of the inner ring 117. A bolt attaching hole 112 is provided in the flange 101 of the hub wheel 102. A hub bolt for fixing the wheel and the brake roller onto the flange 101 is attached to the bolt attaching hole 112.

Double rows of outer raceway surfaces 120 and 121 are provided on the inner periphery of the outer member 105. A flange (vehicle body attaching flange) 132 is provided on the outer periphery of the outer member 105. The first outer raceway surface 120 of the outer member 105 and the first inner raceway surface 118 of the hub wheel 102 face each other. The second raceway surface 121 of the outer member 105 and the raceway surface 119 of the inner ring 117 face each other. A rolling element 122 is interposed therebetween.

A stem shaft 123 of the outer joint component 103 is inserted into the cylinder section 113 of the hub wheel 102. A screw section 124 is provided on an end section of the stem shaft 123 at a section counter to the bowl-shaped section. A spline section 125 is formed between the screw section 124 and the bowl-shaped section 107. A spline section 126 is formed on the inner circumferential surface (inner diameter surface) of the cylinder section 113 of the hub wheel 102. When the stem shaft 123 is inserted into the cylinder section 113 of the hub wheel 102, the spline section 125 on the stem shaft 123 side and the spline section 126 on the hub wheel 102 side are engaged.

Then, a nut component 127 is screwed onto the screw section 124 of the stem shaft 123 projecting from the cylinder section 113, thereby connecting the hub wheel 102 and the outer joint component 103. At this time, an inner end face (back surface) 128 of the nut component 127 and an outer end face 129 of the cylinder section 113 come into contact. In addition, an end face 130 of the bowl-shaped section 107 on the stem shaft side and an outer end face 131 of the inner ring 117 come into contact. In other words, as a result of the nut component 127 being tightened, the hub wheel 102 is held sandwiched between the nut component 127 and the bowl-shaped section 107 via the inner ring 117. As a result, the outer joint component 103 and the hub wheel 102 are positioned in an axial direction, and a predetermined preload is applied to the wheel bearing device.

Patent Document 1: Japanese Patent Laid-Open Publication No. 2004-340311

SUMMARY OF THE INVENTION

Problems to be Solved by the Invention

Conventionally, as described above, the spline section 125 on the stem shaft 123 side and the spline section 126 on the hub wheel 102 side are engaged. Therefore, spline processing is required to be performed on both the stem shaft 123 side and the hub wheel 102 side. As a result, cost increases. In addition, during press-fitting, projections and recesses on the spline 125 on the stem shaft 123 side and on the spline 126 on the hub wheel 102 side are required to be matched. At this time, when press-fitting is performed by flanks being matched, projecting and recessing teeth may become damaged (gouged). When press-fitting is performed by large diameters of the projecting and recessing teeth being matched without matching the flanks, back-lash in a circumferential direction tends to occur. In this way, when back-lash occurs in the circumferential direction, transmission of rotational torque deteriorates. Abnormal noise may also occur. Therefore, when spline engaging is used as in the conventional device, it is difficult to prevent both damage to the projecting and recessing teeth and back-lash in the circumferential direction.

In addition, the nut component 127 is required to be screwed on to the screw section 124 of the stem shaft 123 projecting from the cylinder section 113. Therefore, a screw tightening operation is performed during assembly. Therefore, workability decreases, the number of components increase, and manageability of parts also becomes poor.

The present invention has been proposed in light of the above-described issues. An object of the present invention is to provide a wheel bearing device that can suppress backlash in a circumferential direction and achieve excellent workability in connecting a hub wheel and an outer joint component of a constant velocity universal joint.

Means for Solving the Problems

An invention according to a first aspect is a wheel bearing device including an outer member having a plurality of outer raceway surfaces on an inner periphery, a plurality of inner raceway surfaces opposing the outer raceway surfaces, a plurality of rows of rolling elements disposed between the opposing outer raceway surfaces and inner raceway surfaces, a hub wheel adapted to be attached to a wheel, and a constant velocity universal joint. A stem shaft of an outer joint component of the constant velocity universal joint fitted into a hole section of the hub wheel is integrated with the hub wheel by a projection and recess mating structure. In the wheel bearing device, the projection and recess mating structure is that in which an overall recess mating area of a projection is in close contact with a corresponding recess.

In the invention according to the first aspect, the projection and recess mating structure is that in which the overall recess mating area of the projection is in close contact with a corresponding recess. Therefore, in the mating structure, a gap causing backlash is not formed in a radial direction or the circumferential direction.

An invention according to a second aspect is the invention according to the first aspect in which the projection and recess mating structure is configured by a projection that extends in an axial direction and is provided on one of an outer diameter surface of the stem shaft of the outer joint component and an inner diameter surface of the hole section of the hub wheel being press-fitted into the other along the axial direction, and a recess that mates in close contact with the projection being formed on the other by the projection. In other words, the shape of the projection is transferred onto a recess formation surface on a partner side. At this time, the projection wedges into the recess formation surface on the partner side. As a result, a shaft hole slightly increases in diameter, allowing movement of the projection in the axial direction. When the movement in the axial direction stops, the diameter of the shaft hole contract to return to an original diameter. As a result, the overall recess mating area of the projection is in close contact with the corresponding recess.

An invention according to a third aspect is the invention according to the second aspect, in which the projection and recess mating structure is configured by the projection of the projection and recess mating structure being provided on the stem shaft of the outer joint component of the constant velocity universal joint. A hardness of at least an axial direction end section of the projection is higher than that of an inner diameter section of the hole section of the hub wheel. The recess that mates in close contact with the projection is formed on the inner diameter surface of the hole section of the hub wheel by the projection as a result of the stem shaft being press-fitted into the hole section of the hub wheel from an axial direction end section side of the projection.

An invention according to a fourth aspect is the invention according to the second aspect, in which the projection and recess mating structure is configured by the projection of the projection and recess mating structure being formed on the inner diameter surface of the hole section of the hub wheel. A hardness of at least an axial direction end section of the projection is higher than that of an outer diameter section of the stem shaft of the outer joint component of the constant velocity universal joint. The recess that mates in close contact with the projection is formed on the outer diameter surface of the stem shaft of the outer joint component by the projection as a result of the projection on the hub wheel side being press-fitted into the stem shaft of the outer joint component from an axial direction end section side of the projection.

An invention according to a fifth aspect is the invention according to the third aspect, in which a pocket section for housing a protruding section formed as a result of the recess being formed by press-fitting is provided on the stem shaft.

An invention according to a sixth aspect is the invention according to the fourth aspect, in which a pocket section for housing a protruding section formed as a result of the recess being formed by press-fitting is provided on the inner diameter surface of the hole section of the hub wheel.

Here, the protruding section is equivalent to an amount of material of a dimension of the recess into which the recess mating area of the projection fits (engages). The protruding section is configured by the material pushed out from the recess that has been formed, a material cut away to form the recess, both the material that has been pushed out and the material that has been cut away, or the like.

An invention according to a seventh aspect is the invention according to the fifth aspect, in which the pocket section for housing the protruding section is provided on a press-fitting starting side of the projection of the stem shaft, and a shoulder section for centering with the hole section of the hub wheel is provided on an axial direction counter-projection side of the pocket section.

An invention according to an eighth aspect is the invention according to the first to seventh aspect, in which a projection direction intermediate area of the projection corresponds to a position of a recess formation surface before the recess is formed on the hole section of the hub wheel.

An invention according to a ninth aspect is the invention according to the eighth aspect, in which a maximum diameter dimension of an arc connecting peaks of a plurality of projections is greater than an inner diameter dimension of a stem shaft fitting hole of the hub wheel, and a minimum outer diameter dimension of a stem shaft outer diameter surface between projections is smaller than the inner diameter dimension of the stem shaft fitting hole of the hub wheel.

An invention according to a tenth aspect is the invention according to the eighth aspect, in which a diameter dimension of an arc connecting peaks of a plurality of projections of a shaft hole is smaller than an outer diameter dimension of the stem shaft of the outer joint component, and an inner diameter dimension of an inner diameter surface of the hole section between projections is greater than the outer diameter dimension of the stem shaft of the outer joint component.

An invention according to an eleventh aspect is the invention according to the second to tenth aspect, in which a circumferential direction thickness of a projection direction intermediate area of the projection is smaller than a circumferential direction dimension at a position between projections adjacent in the circumferential direction corresponding to the intermediate area.

An invention according to a twelfth aspect is the invention according to the first to tenth aspect, in which a sum of circumferential direction thicknesses of projection direction intermediate areas of the projections is smaller than a sum of circumferential direction thicknesses of projections on a partner side at positions corresponding to the intermediate areas, the projections on the partner side engaging with the projections adjacent in the circumferential direction.

An invention according to a thirteenth aspect is the invention according to the first to twelfth aspect, in which a saw tooth section is provided on the projection side of the projection and recess mating structure.

An invention according to a fourteenth aspect is the invention according to the first to thirteenth aspect, in which the outer joint component of the constant velocity universal joint includes a mouth section in which an inner joint component is included and the stem shaft provided such as to project from a bottom section of the mouth section. An end section of the hub wheel is crimped and preload is applied to an inner ring of a roller bearing fitted onto the hub wheel. The mouth section is in a non-contacting state with the hub wheel.

An invention according to a fifteenth aspect is the invention according to the first to fourteenth aspect, in which one inner raceway surface opposing the double rows of outer raceway surfaces and a cylindrical small-diameter stepped section are formed on an outer periphery of the hub wheel. The other inner raceway surface opposing the double rows of outer raceway surfaces is formed on an outer periphery of an inner ring fitted onto the small-diameter stepped section. A close-contact mating section is disposed in a position avoiding a position directly below at least the raceway surface of the inner ring, among the raceway surfaces of the double rows of roller bearings.

In the close-contact mating structure, the hub wheel that is an outer member is press-fitted into the stem shaft that is an inner member. Therefore, the hub wheel and the inner ring expand. The expansion generates hoop stress in raceway grooves (raceway surfaces) of each component, an inner ring shoulder section, between raceway grooves on both sides, and an inner ring small-outer diameter section. "Hoop stress" refers to a force expanding in diameter in an outward radial direction. When the hoop stress is excessive, problems occur in the roller bearing. When the hoop stress is applied to any of the raceway surfaces, a decrease in rolling fatigue life and crack formation may occur. In addition, the hoop stress also occurs in the inner ring at a stage in which press-fitting is performed into the hub wheel with interference. Therefore, the generation of hoop stress on the raceway surface of the inner ring and at the shoulder section of the inner ring is particularly large. When the hoop stress is applied to the inner ring, stress corrosion cracking may occur as a result of rust on an end surface section exposed externally.

Therefore, the close-contact mating section is disposed at a position avoiding at least a position directly below the raceway surface of the inner ring, among the raceway surfaces of the double rows of roller bearings. As a result, the generation of hoop stress outside of the area of the close-contact mating section can be minimized. Therefore, problems such as decrease in rolling fatigue life, formation of cracks, stress corrosion cracking, and the like, occurring in the bearing can be prevented. A high-quality bearing can be provided.

Because the projection and recess mating structure can be formed by the stem shaft being press-fitted into the inner circumferential surface of the hub wheel, a nut fastening operation is not required to be performed when the stem shaft and the hub wheel are connected. Therefore, assembly operation can be facilitated. Cost related to the assembly operation can be reduced, and weight can be reduced.

An invention according to a sixteenth aspect is the invention according to the first to fourteenth aspect, in which the close-contact mating section is disposed in a position avoiding positions directly below both raceway surfaces of the double rows of roller bearings.

An invention according to a seventeenth aspect is the invention according to the first to fourteenth aspect, in which the close-contact mating section is disposed between a raceway surface on an inboard side and a raceway surface on an outboard side of the double rows of roller bearings.

An invention according to an eighteenth aspect is the invention according to the first to fourteenth aspect, in which the close-contact mating section is disposed closer to an outboard side than an outboard side end section of a raceway surface on an outboard side of the double rows of roller bearings.

In the inventions according to the sixteenth to eighteenth aspects, the hoop stress generated in the raceways on the outboard side and the inboard side, between raceways, an inner ring shoulder section, and the like that are excluded from the area of the close-contact mating section can be minimized. As a result, problems, such as decrease in rolling fatigue life, formation of cracks, stress corrosion cracking, and the like, occurring in the bearing can be further prevented. A bearing of a higher quality can be provided.

Advantage of the Invention

In the wheel bearing device of the present invention, in the mating structure, a gap causing backlash is not formed in the radial direction or the circumferential direction. Therefore, the overall mating area can contribute to rotational torque transmission. A stable torque transmission can be achieved, and abnormal noise does not occur. Moreover, because the mating area is in close contact without gaps, strength of the torque transmission area is enhanced. Therefore, a driving wheel bearing unit can be made light and compact.

The recess that mates in close contact with the projection can be formed by the projection provided on one of the outer diameter surface of the stem shaft of the outer joint component and the inner diameter surface of the hole section of the hub wheel being press-fitted into the other along the axial direction. Therefore, the projection and recess mating structure can be formed with certainty. Moreover, a spline section and the like are not required to be formed on the component on which the projections are formed. As a result, manufacturability is excellent. In addition, phase matching of the splines is not required to be performed. Facilitation of assembly can be enhanced, damage to flanks during press-fitting can be prevented, and a stable mating state can be maintained.

When the projections of the projection and recess mating structure is provided on the stem shaft of the outer joint component of the constant velocity universal joint, the hardness of the axial direction end sections of the projections is higher than that of the inner diameter section of the hole section of the hub wheel, and the stem shaft is press-fitted into the hole section of the hub wheel from the axial direction end section side of the projections, the hardness of the stem shaft side can be increased. Rigidity of the stem shaft can be improved. When the projections of the projection and recess mating structure is provided on the inner diameter surface of the hole section of the hub wheel, the hardness of the axial direction end sections of the projections is higher than that of the outer diameter section of the stem shaft of the outer joint component of the constant velocity universal joint, and the projections on the hub wheel side is press-fitted into the stem shaft of the outer joint component from the axial direction end section side of the projections, hardening treatment (heat treatment) is not required to be performed on the stem shaft side. Manufacturability of the outer joint component of the constant velocity universal joint is excellent.

Because the pocket section for housing the protruding section formed as a result of the recesses being formed by press-fitting is provided, the protruding section can be held (maintained) within the pocket section. The protruding section does not enter the vehicle outside of the device or the like. In other words, the protruding section can remain housed within the pocket section. A process for removing the protruding section is not required to be performed. The number of assembly operations can be reduced. Assembly workability can be improved, and cost can be reduced.

Because the shoulder section used for centering with the hole section of the hub wheel is provided on the axial direction counter-projection side of the pocket section, the protruding section within the pocket section does not protrude towards the shoulder section side. The protruding section can be housed more stably. Moreover, because the shoulder section is used for centering, the stem shaft can be press-fitted into the hub wheel while preventing misalignment. Therefore, the outer joint component and the hub wheel can be connected with high accuracy. Stable torque transmission can be performed.

As a result of the projection direction intermediate areas of the projections being disposed on the recess formation surface before the recesses are formed, the projecting areas wedge into the recess formation surface when the projections are press-fitted. The recesses can be formed with certainty.

The circumferential direction thickness of the projection direction intermediate area of the projection is smaller than the dimension at the position between projections adjacent in the circumferential direction corresponding to the intermediate area. Therefore, the circumferential direction thickness of the projection direction intermediate area of the projections (projections between the recesses that are formed) on the side on which the recesses are formed can be increased. As a result, shear area of the projections (low-hardness projections between the recesses, formed as a result of the recesses being formed) on the partner side can be increased, thereby ensuring torsional strength. Moreover, because the tooth thickness of the projection on the side with the higher hardness is small, press-fitting load can be reduced. Facilitation of press-fitting can be enhanced.

As a result of the saw tooth section being provided on the projection side, when press-fitting is performed, the saw tooth section wedges into the side with the low hardness (the side on which the recesses mating with the projections are formed), along the axial direction. As a result of the wedging, a dislocation stopper can be configured for stopping dislocation in the axial direction of the outer joint component of the constant velocity universal joint from the hub wheel. As a result, a stable connection state can be maintained. Quality of the wheel bearing device can be enhanced. Moreover, because the dislocation stopper can be configured by the saw tooth section, screw-tightening, such as that which is conventionally required, can be omitted. Therefore, a screw section that projects from the hole section of the hub wheel is not required to be formed on the stem shaft. Weight reduction can be achieved. In addition, the screw tightening operation can be omitted, and assembly workability can be enhanced.

The mouth section is in a non-contacting state with the hub wheel. Therefore, abnormal noise caused by contact between the mouth section and the hub wheel can be prevented. Because the end section of the hub wheel is crimped, and the preload is applied to the inner ring of the roller bearing, the preload is not required to be applied to the inner ring by the mouth section of the outer joint component. Therefore, the stem shaft of the outer joint component can be press-fitted without taking into consideration the preload applied to the inner ring. Facilitation of connection (assembly) between the hub wheel 1 and the outer joint component can be enhanced.

BRIEF DESCRIPTION OF THE DRAWINGS

FIG. 2b is an enlarged view of section X in FIG. 2a;

FIG. 10b is an enlarged cross-sectional view of section Y in FIG. 10a;

DETAILED DESCRIPTION OF THE INVENTION

Figure 1:
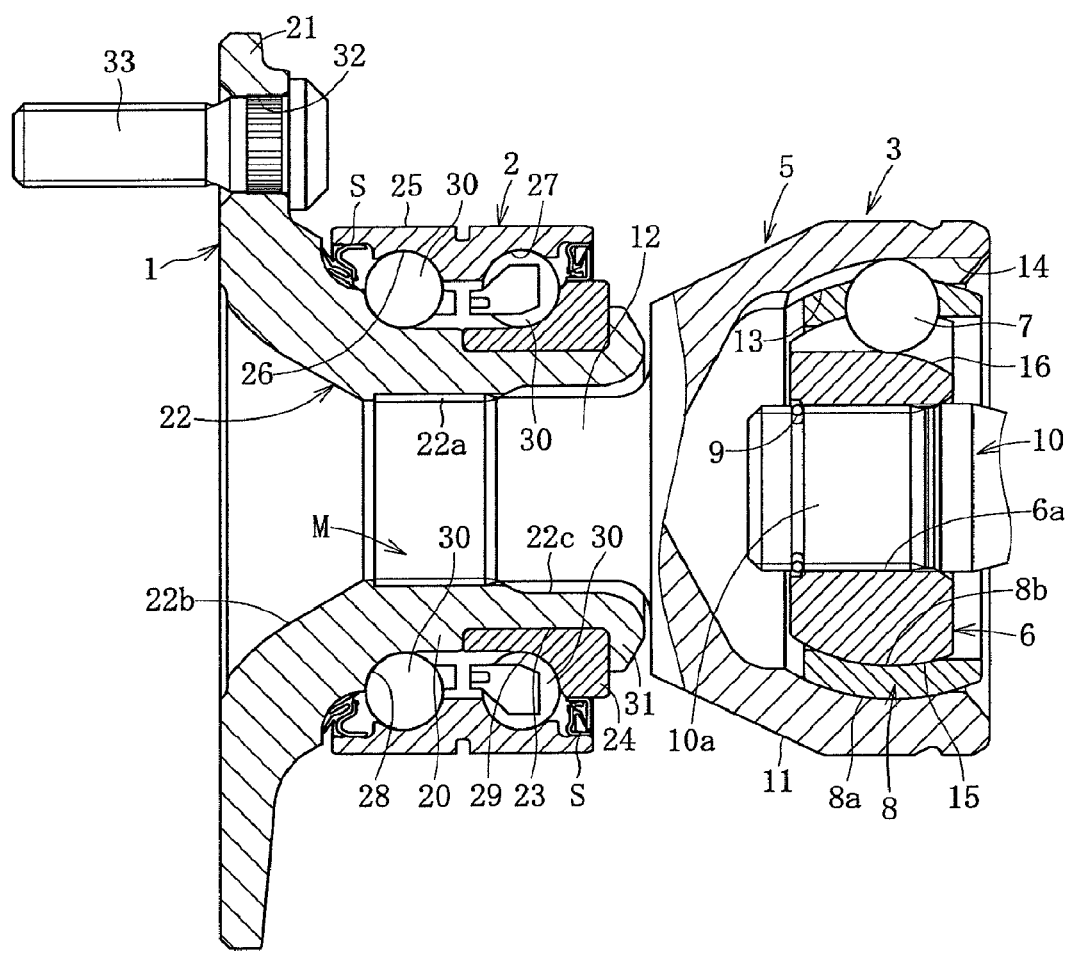
FIG. 1 is a cross-sectional view of a wheel bearing device according to a first embodiment of the present invention.

Embodiments of the present invention will be hereinafter described with reference to FIG. 1 to FIG. 12. FIG. 1 shows a wheel bearing device according to a first embodiment. In the wheel bearing device, a hub wheel 1, a double-row roller bearing 2, and a constant velocity universal joint 3 are integrated.

The constant velocity universal joint 3 includes an outer ring 5, an inner ring 6, a plurality of balls 7, and a cage 8 as main components. The outer ring 5 serves as an outer joint component. The inner ring 6 serves as an inner joint component disposed on an inner side of the outer ring 5. The balls 7 are interposed between the outer ring 5 and the inner ring 6, and transmit torque. The cage 8 is interposed between the outer ring 5 and the inner ring 6, and holds the balls 7. An end section 10a of a shaft 10 is press-fitted into a shaft hole inner diameter 6a of the inner ring 6, thereby connecting the inner ring 6 to the shaft 10 by spline engagement to allow torque transmission. A stopper ring 9 fitted onto the end section 10a of the shaft 10 to prevent shaft dislocation.

The outer ring 5 includes a mouth section 11 and a stem shaft 12. The mouth section 11 has a bowl shape of which one end is open. A plurality of track grooves 14 extending in an axial direction are formed on an inner spherical surface 13 of the mouth section 11, at even intervals in a circumferential direction. The track grooves 14 extend to the opening end of the mouth section 11. a plurality of track grooves 16 extending in the axial direction are formed on an outer spherical surface 15 of the inner ring 6, at even intervals in the circumferential direction.

A track groove 14 on the outer ring 5 and a track groove 16 on the inner ring 6 forms a pair. A plurality of balls 7 each serving as a torque transmitting element is placed on a ball track formed by each pair of track groove 14 and track groove 16, such as to be allowed to roll. The ball 7 is interposed between the track groove 14 on the outer ring 5 and the track groove 16 on the inner ring 6, and transmits torque. The cage 8 is interposed between the outer ring 5 and the inner ring 6 such as to be allowed to slide. An outer spherical surface 8a of the cage 8 is in contact with the inner spherical surface 13 of the outer ring 5. An inner spherical surface 8b is in contact with the outer spherical surface 15 of the inner ring 6. The constant velocity universal joint in this instance is an undercut-free type having a linear straight section on a groove bottom of each track groove 14 and track groove 16. However, other types of constant velocity universal joints, such as a Rzeppa type, can be used.

The hub wheel 1 includes a cylinder section 20 and a flange 21. The flange 21 is provided on an end section of the cylinder section 20 on a counter-joint side. A hole section 22 of the cylinder section 20 includes a stem shaft fitting hole 22a in an intermediate section in an axial direction, a tapered hole 22b on the counter-joint side, and a large diameter hole 22c on the joint side. In other words, the stem shaft 12 of the outer ring 5 of the constant velocity universal joint 3 and the hub wheel 1 are connected in the stem shaft fitting hole 22a, by a projection and recess mating structure M, described hereafter.

The roller bearing 2 includes an inner member 24 and an outer member 25. The inner member 24 engages with a stepped section 23 provided on the joint side periphery of the hub wheel 1. The outer member 25 is fitted outside of the hub wheel 1. Two rows of outer raceway surfaces 26 and 27 are provided on an inner periphery of the outer member 25. The first outer raceway surface 26 and a first inner raceway surface 28 provided on a stem shaft outer periphery of the hub wheel 1 face each other. The second outer raceway surface 27 and a second inner raceway surface 29 provided on an outer circumferential surface of the inner member (inner ring) 24 face each other. Each ball serving as a rolling element 30 is interposed therebetween. Sealing components S are attached to both openings of the outer member 25.

In this case, the end section of the hub wheel 1 on the joint side is crimped. Preload is applied to the inner ring 24 at the crimped section 31. As a result, the inner ring 24 can be fastened onto the hub wheel 1. A bolt attaching hole 32 is provided on the flange 21 of the hub wheel 1. A hub bolt 33 is attached to the bolt attaching hole 32 to fix a wheel and a brake rotor onto the flange 21.

Figure 2A:
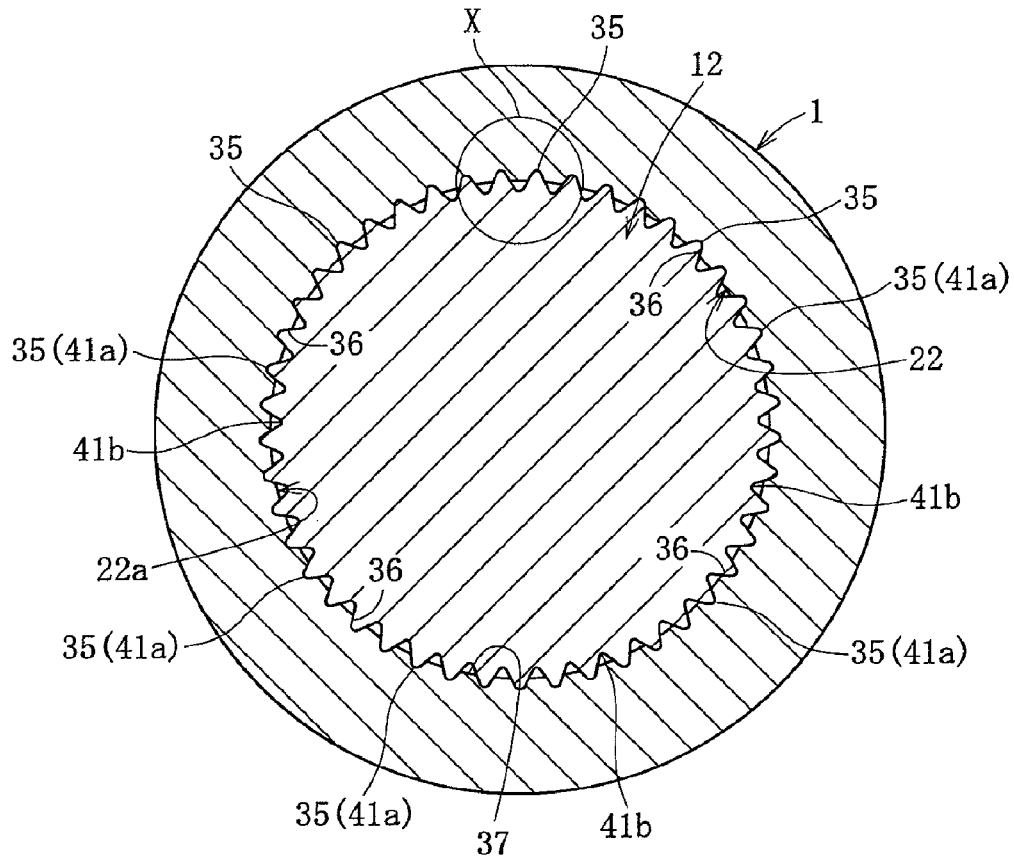
FIG. 2a is an enlarged cross-sectional view of a projection and recess mating structure of the wheel bearing device.
Figure 2B:
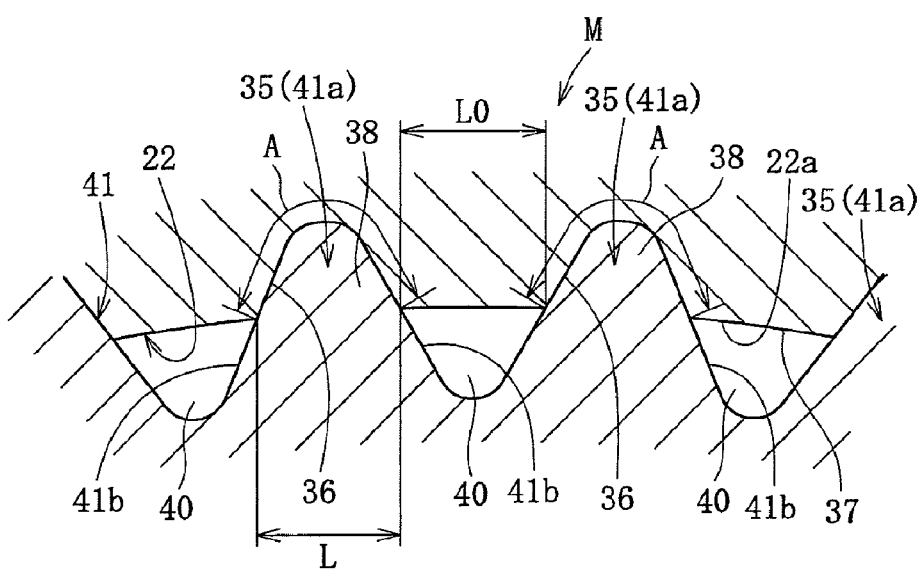

As shown in FIG. 2a and FIG. 2b, the projection and recess mating structure M includes, for example, a projection 35 and a recess 36. The projection 35 is provided on an end section of the stem shaft 12 and extends in the axial direction. The recess 36 is formed on an inner diameter surface (in this instance, an inner diameter surface 37 of the stem shaft fitting hole 22a) of the hole section 22 of the hub wheel 1. An overall recess mating area 38 of a projection 35 is in close contact with a corresponding recess 36. In other words, a plurality of projections 35 are disposed at a predetermined pitch along a circumferential direction on the outer circumferential surface of the stem shaft 12 on the counter-mouth section side. A plurality of recesses 36 with which the projections 35 mate are formed along the circumferential direction on the inner diameter surface 37 of the stem fitting hole 22a of the hole section 22 of the hub wheel 1. In other words, the projections 35 and the recesses 36 that mate with the projections 35 are tightly fitted along the overall periphery in the circumferential direction.

In this case, each projection 35 has a triangular-shaped (peak shape) cross-section having a projecting arc-shaped peak. The recess mating area 38 of each projection 35 is an area A shown in FIG. 2b. The area is extends from a halfway section to the peak of the peak shape of the cross-section. A gap 40 is formed between the projections 35 adjacent to each other in the circumferential direction, further to the inner diameter side than the inner diameter surface 37 of the hub wheel 1.

In this way, the hub wheel 1 and the stem shaft 12 of the outer ring S of the constant velocity universal joint 3 are connected by the projection and recess mating structure M. At this time, the end section of the hub wheel 1 on the joint side is crimped, and the preload is applied to the inner member (inner ring) 24 at the crimped section 31. Therefore, the preload is not required to be applied at the mouth section 11 of the outer ring 5. A non-contacting state is achieved in which the mouth section 11 is not in contact with the end section (in this instance, the crimped section 31) of the hub wheel 1.

In the present invention, the overall recess mating area 38 of the projection 35 is in close contact with the corresponding recess 36 in the projection and recess mating structure M. Therefore, in the mating structure M, a gap causing backlash is not formed in the radial direction and the circumferential direction. Therefore, the overall mating area contributes to rotational torque transmission, and stable torque transmission can be achieved. In addition, abnormal noise does not occur.

Because the mouth section 11 is in a non-contacting state with the hub wheel 1, abnormal noise caused by contact between the mouth section 11 and the hub wheel 1 can be prevented. In addition, because the end section of the hub wheel 1 is crimped, and the preload is applied to the inner ring 24 of the roller bearing 2, the preload is not required to be applied to the inner ring 24 by the mouth section 11 of the outer joint component. Therefore, the stem shaft 12 of the outer joint component can be press-fitted without taking into consideration the preload on the inner ring 24. Facilitation of connection (assembly) between the hub wheel 1 and the outer joint component can be enhanced.

Figure 3:
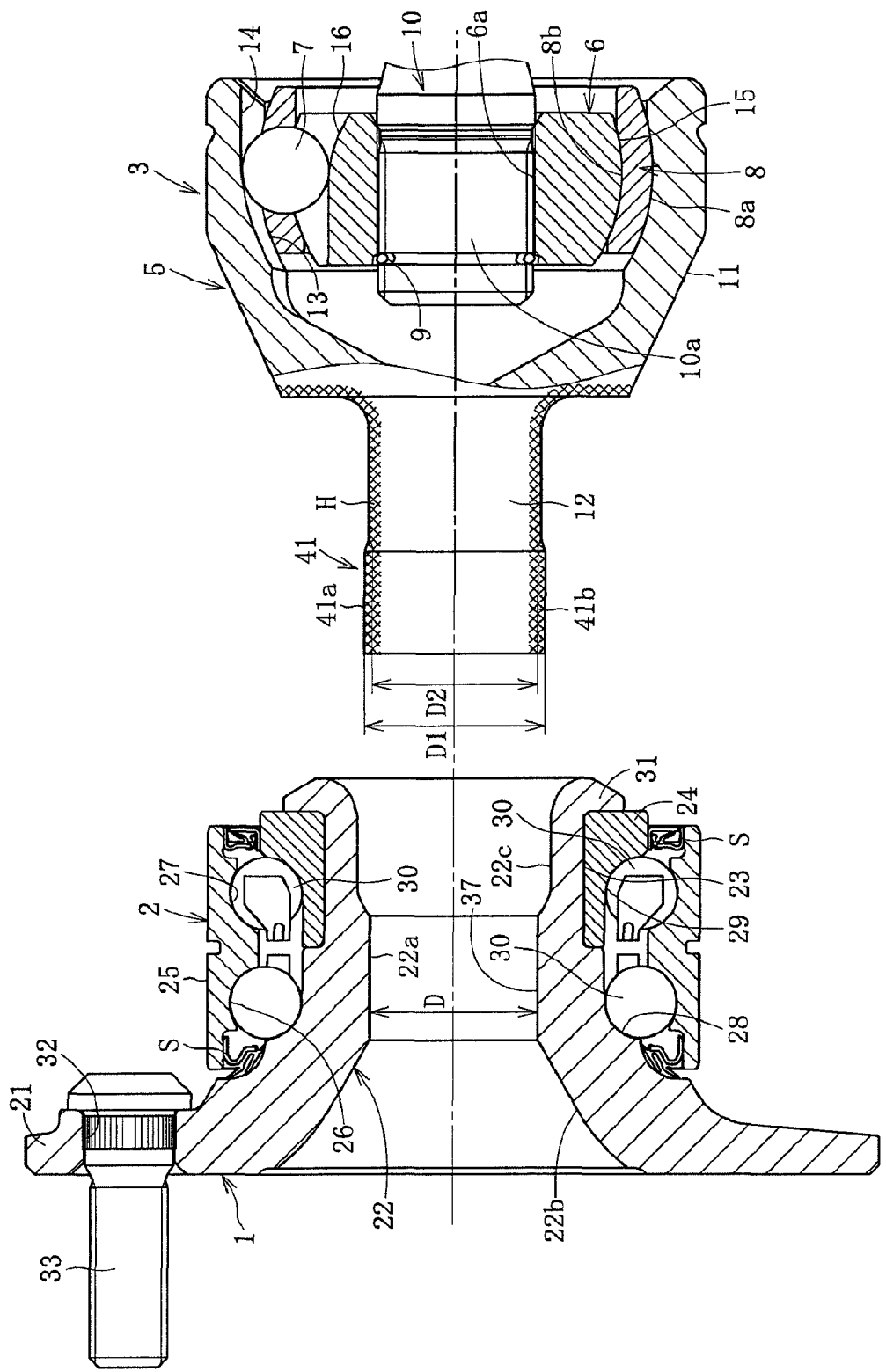
FIG. 3 is a cross-sectional view of the wheel bearing device before a constant velocity universal joint is assembled.

Next, a mating method of the projection and recess mating structure M will be described. In this case, as shown in FIG. 3, a thermally hardening process is performed on the outer diameter section of the stem shaft 12. A spline 41 is formed on a hardened layer H. The spline 41 includes projections 41a and recesses 41b along the axial direction. Therefore, the projections 41a of the spline 41 are hardened. The projections 41a serve as the projections 35 of the projection and recess mating structure M. The inner diameter surface 37 of the hole section 22 of the hub wheel 1 is a unhardened section on which a thermally hardening process is not performed. In FIG. 3, cross-hatched sections indicate the hardened layer H. A difference in hardness between the hardened layer H and the unhardened section of the inner diameter surface 37 of the hole section 22 of the hub wheel 1 is 30 point or more on the HRC scale. A module of the spline 41 of the stem shaft 12 is a small tooth of 0.5 or less. Here, the module refers a value that is a pitch circle diameter divided by a number of teeth.

At this time, an intermediate area of the projection 35 in the projection direction corresponds to a position on a recess forming surface (in this instance, the inner diameter surface 37 of the hole section 22 of the hub wheel 1) before recess formation. In other words, an inner diameter dimension D of the inner diameter surface 37 of the hole section 22 is set to be smaller than a maximum outer diameter of the projection 35, namely a maximum diameter dimension (circumscribing circle diameter) D1 of a circle connecting the peaks of the projections 35 that are the projections 41a of the spline 41. The inner diameter dimension D is also set to be greater than an outer diameter dimension of a stem shaft outer diameter surface between the projections, namely a maximum diameter dimension D2 of a circle connecting the bottoms of the recesses 41b of the spline 41. In other words, D2<D<D1.

The spline 41 can be formed by various processing methods, such as a rolling process, a cutting process, a pressing process, and an extracting process, which are conventionally known means. Various types of heat treatment, such as high-frequency hardening, and carburizing and quenching, can be used for the thermally hardening process.

As shown in FIG. 3, the stem shaft 12 of the outer ring 5 is inserted (press-fitted) into the hub wheel 1 in a state in which an axial center of the hub wheel 1 and an axial center of the outer ring 5 of the constant velocity universal joint 3 are aligned. At this time, a relationship such as that described above is established among the diameter dimension D of the inner diameter surface 37 of the hole section 22, the maximum outer diameter dimension D1 of the projections 35, and the minimum outer diameter D2 of the recesses of the spline 41. In addition, the hardness of the projections 35 is greater than the hardness of the inner diameter surface 37 of the hole section 22 by 30 points or more. Therefore, when the stem shaft 12 is press-fitted into the hole section 22 of the hub wheel 1, the projections 35 wedge into the inner diameter surface 37. The projections 35 form the recesses 36 with which the projections 35 mate, along the axial direction.

As a result, as shown in FIG. 2a and FIG. 2b, a mating state can be configured in which the overall recess mating area 38 of the projection 35 on the end section of the stem shaft 12 is in close contact with the corresponding recess 36. In other words, the shape of the projections 35 is transferred onto the recess forming surface (in this instance, the inner diameter surface 37 of the hole section 22) of the partner side. At this time, as a result of the projections 35 wedging into the inner diameter surface 37 of the hole section 22, the hole section 22 is in a state in which the diameter is slightly widened. Movement in the axial direction of the projections 35 is allowed. When the movement in the axial direction stops, the diameter of the hole section 22 contracts such as to return to the original diameter. In other words, the hub wheel 1 elastically deforms in the radial direction when the projection 35 is press-fitted. Preload equivalent to the amount of elastic deformation is applied to the flanks of the projections 35 (a front surface of the recess mating area 38). Therefore, the projection and recess mating structure M in which the overall recess mating area 38 of the projection 35 is in close contact with the corresponding recess 36 can be formed with certainty. Moreover, a spline section or the like is not required to be formed on the component on which the recesses 36 are formed (in this instance, the hub wheel 1). As a result, manufacturability is excellent Moreover, phase matching of the splines is not required to be performed. Facilitation of assembly can be enhanced, damage to the flanks during press-fitting can be prevented, and a stable mating state can be maintained.

According to the above-described embodiment, the spline 41 formed on the stem shaft 12 uses small teeth of which the module is 0.5 or less. Therefore, facilitation in forming the splines 41 can be enhanced and press-fitting load can be reduced. The projections 35 can be configured by a spline ordinarily formed on this type of shaft. Therefore, the projections 35 can be easily formed at a low cost.

When the recesses 36 are formed by the stem shaft 12 being press-fitted into the hub wheel 1, work-hardening occurs on the recess 36 side. Here, work-hardening refers to a phenomenon in which, when plastic deformation (plastic working) is performed on an object, resistance against deformation increases as a degree of deformation increases. The object becomes harder than a material that has not been deformed. Therefore, as a result of plastic deformation occurring during press-fitting, the inner diameter surface 37 of the hub wheel 1 on the recess 36 side hardens, and rotational torque transmission is improved.

Here, in the spline 41 shown in FIG. 3, the pitch of the projections 41a and the pitch of the recesses 41b are set to a same pitch. Therefore, according to the above-described embodiment, as shown in FIG. 2a and FIG. 2b, a circumferential direction thickness L of the projection direction intermediate area of the projection 35 and a circumferential direction dimension L0 at a position corresponding to the intermediate area between projections 35 that are adjacent in the circumferential direction are almost the same.

Figure 4:
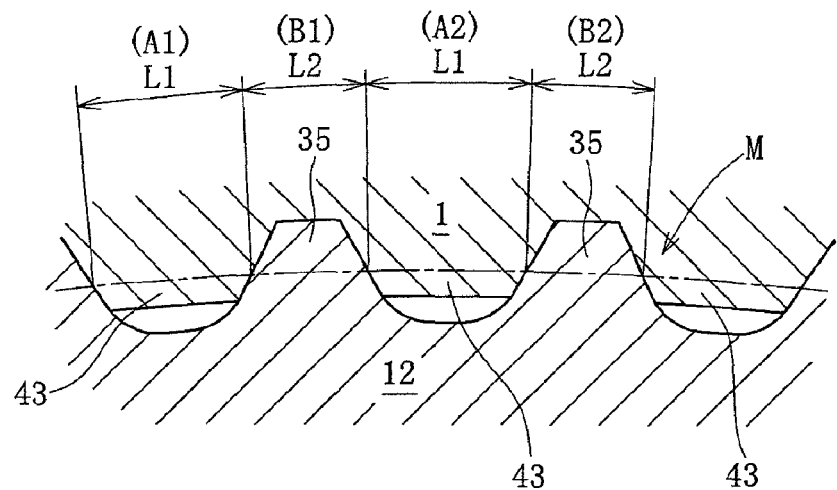
FIG. 4 is an enlarged cross-sectional view of a main part of a modified example of the projection and recess mating structure.

On the other hand, as shown in FIG. 4, a circumferential direction thickness L2 of the projection direction intermediate area of the projection 35 can be smaller than a circumferential direction dimension L1 at a position corresponding to the intermediate area between projections 35 that are adjacent in the circumferential direction, In other words, in the spline 41 formed on the stem shaft 12, the circumferential direction thickness (tooth thickness) L2 of the projection direction intermediate area of the projection 35 is smaller than the circumferential direction thickness (tooth thickness) of the projection direction intermediate area of the projection 43 on the hub wheel 1 side that is engaged between the projections 35.

Therefore, a sum $\Sigma(B1+B2+B3+\ldots)$ of the tooth thickness of the projections 35 over the overall circumference on the stem shaft 12 side is set to be smaller than a sum $\Sigma(A1+A2+A3+\ldots)$ of the tooth thickness of the projections 43 (projecting teeth) on the hub wheel 1 side. As a result, shear area of the projections 43 on the hub wheel 1 side can be increased, and torsional strength can be ensured. Moreover, because the tooth thickness of the projection 35 is small, press-fitting load can be reduced. Facilitation of press-fitting can be enhanced. When the sum of the circumferential direction thickness of the projections 35 is smaller than the sum of the circumferential direction thickness of the projections 43 on the partner side, the circumferential direction thickness L2 of all projections 35 are not required to be smaller than the dimension L1 in the circumferential direction between projections 35 adjacent in the circumferential direction. In other words, regardless of whether a circumferential direction thickness of an arbitrary projection 35 among the plurality of projections 35 is the same as the dimension in the circumferential direction between projections adjacent in the circumferential direction or greater than the dimension in the circumferential direction, all that is required is that the sum is smaller. The projections 35 in FIG. 4 have a trapezoidal (Mount Fuji-shaped) cross-section.

Figure 5:
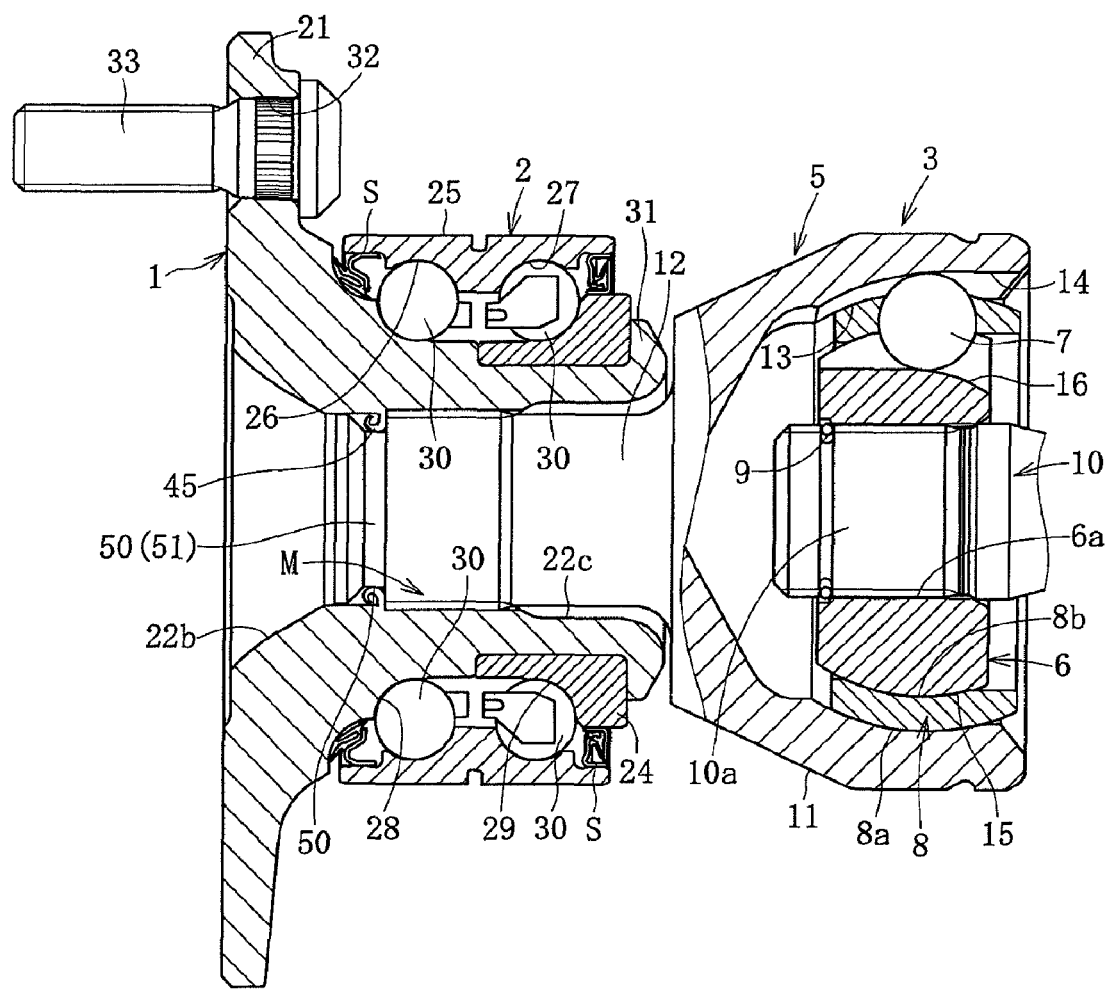
FIG. 5 is a cross-sectional view of a wheel bearing device according to a second embodiment of the present invention.

Here, when the stem shaft 12 of the outer ring 5 is press-fitted into the hub wheel 1, a protruding section 45, such as that shown in FIG. 5 according to a second embodiment, is formed by a material being pushed out from the recesses 36 formed by the projections 35. The protruding section 45 is equivalent to an amount of material of a dimension of the recess 36 into which the recess mating area 38 of the projection 35 fits (engages). The protruding section 45 is configured by the material pushed out from the recess 36 that has been formed, a material cut away to form the recess 36, both the material that has been pushed out and the material that has been cut away, or the like.

Therefore, the wheel bearing device shown in FIG. 1 requires an operation to remove the protruding section 45 after the constant velocity universal joint is assembled to the hub wheel 1. According to the second embodiment shown in FIG. 5, a pocket section 50 for housing the protruding section 45 is provided on the stem shaft 12.

Figure 6:
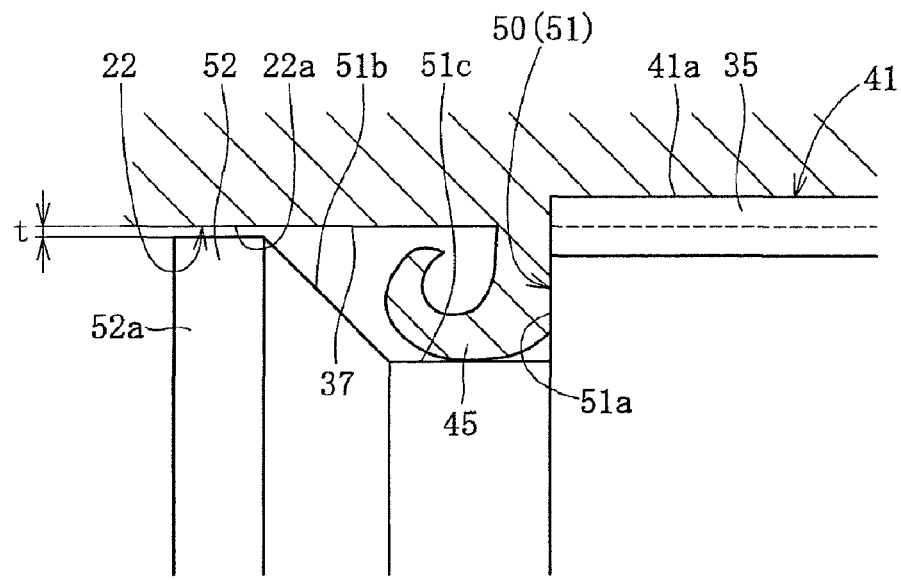
FIG. 6 is an enlarged cross-sectional view of a main part of the wheel bearing device in FIG. 5.

In other words, a pocket section 50 is formed by a circumferential direction groove 51 being provided on a shaft end edge of the spline 41 of the stem shaft 12. As shown in FIG. 6, in the circumferential direction groove 51, a side wall 51a on the spline 41 side is a plane perpendicular to the axial direction. A side face 51b on a counter-spline side is a tapered surface that widens in diameter from a groove bottom 51c towards the counter-spline side.

A disk-shaped shoulder section 52 used for centering is provided further to the counter-spline side than the side face 51b. The outer diameter dimension of the shoulder section 52 is set to be the same or slightly smaller than a hole diameter of the fitting hole 22a of the hole section 22. In this instance, a miniscule gap t is provided between an outer diameter surface 52a of the shoulder section 52 and the inner diameter surface of the fitting hole 22a of the hole section 22.

Even in the outer ring 5 shown in FIG. 6, when the stem shaft 12 is press-fitted into the hole section 22 of the hub wheel 1, the recesses 36 can be formed on the hub wheel 1 side by the projections 35 on the stem shaft 12 side. At this time, the protruding section 45 that is formed is curled and housed within the pocket section 50, as shown in FIG. 6. In other words, a portion of the material cut away or pushed out from the inner diameter surface of the hole section 22 enters the pocket section 50.

In this way, as a result of the pocket section 50 being provided that holds the protruding section 45 formed as a result of the recesses being formed by press-fitting, the protruding section 45 can be held (maintained) within the pocket section 50. The protruding section 45 does not enter the vehicle outside of the device or the like. In other words, the protruding section 45 can remain housed within the pocket section 50. A process for removing the protruding section 45 is not required to be performed. The number of assembly operations can be reduced. Assembly workability can be improved, and cost can be reduced.

As a result of the shoulder section 52 used for centering with the hole section 22 of the hub wheel 1 being provided on the axial direction counter-projection side of the pocket section 50, the protruding section 45 within the pocket section 50 does not protrude towards the shoulder section 52 side. The protruding section 45 can be housed more stably. Moreover, because the shoulder section 52 is used for centering, the stem shaft 12 can be press-fitted into the hub wheel 1 while preventing misalignment. Therefore, the outer joint component 5 and the hub wheel 1 can be connected with high accuracy. Stable torque transmission can be performed.

Because the shoulder section 52 is used for centering during press-fitting, the outer dimension is preferably set to be slightly smaller than the hole diameter of the fitting hole 22a of the hole section 22 of the hub wheel 1. In other words, when the outer diameter dimension of the shoulder section 52 is the same or greater than as the hole diameter of the fitting hole 22a, the shoulder section 52 itself is press-fitted into the fitting hole 22a. At this time, when misalignment occurs, the projections 35 of the projection and recess mating structure M are press-fitted in this state. The stem shaft 1 and the hub wheel 1 are connected in a state in which the axial center of the stem shaft 12 and the axial center of the hub wheel 1 are misaligned. When the outer diameter dimension of the shoulder section 52 is excessively smaller than the hole diameter of the fitting hole 22a, the shoulder section 52 does not function as that for centering. Therefore, the miniscule gap t between the outer diameter surface 52a of the shoulder section 52 and the inner diameter surface of the fitting hole 22a of the hole section 22 is preferably set to about 0.01 millimeters to 0.2 millimeters.

Other configurations of the wheel bearing device shown in FIG. 5 are similar to those of the wheel bearing device shown in FIG. 1. Therefore, components that are the same are given the same reference numbers as those in FIG. 1. Explanations thereof are omitted. Therefore, the wheel bearing device shown in FIG. 5 achieves effects similar to those of the wheel bearing device shown in FIG. 1.

Figure 7:
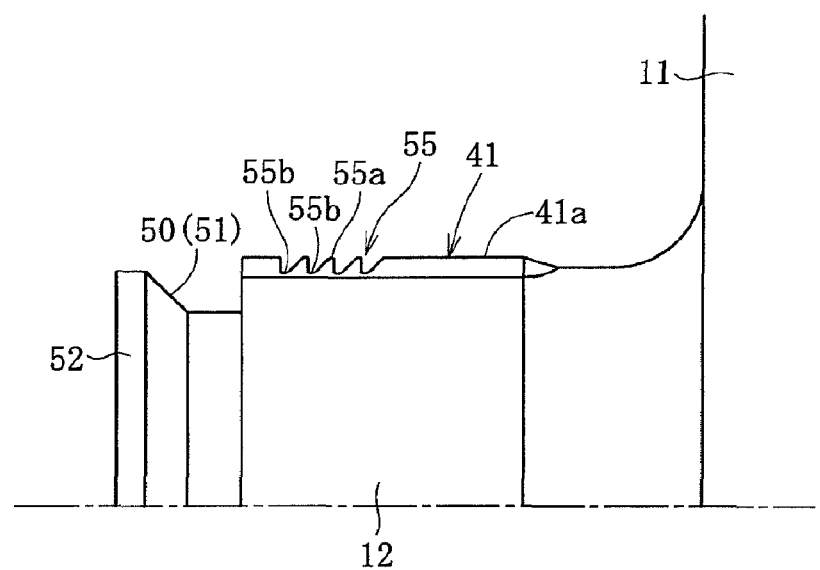
FIG. 7 is a side view of a main part of an outer joint component of a wheel bearing device according to a third embodiment of the present invention.

Next, FIG. 7 shows a third embodiment. In a projection and recess mating structure M according to the third embodiment, a saw tooth section 55 is formed on the projection 35 of the stem axis 12, namely the projection 41a of the spline 41. The saw tooth section 55 is a small projecting and recess formed along a longitudinal direction of the peak section of the projection 41a In this instance, a cross-section of a projection (projecting tooth) 55a is a right triangle in which the pocket side is an angled surface. The saw tooth section 55 shown in FIG. 7 is provided on the pocket section 50 side.

Figure 8:
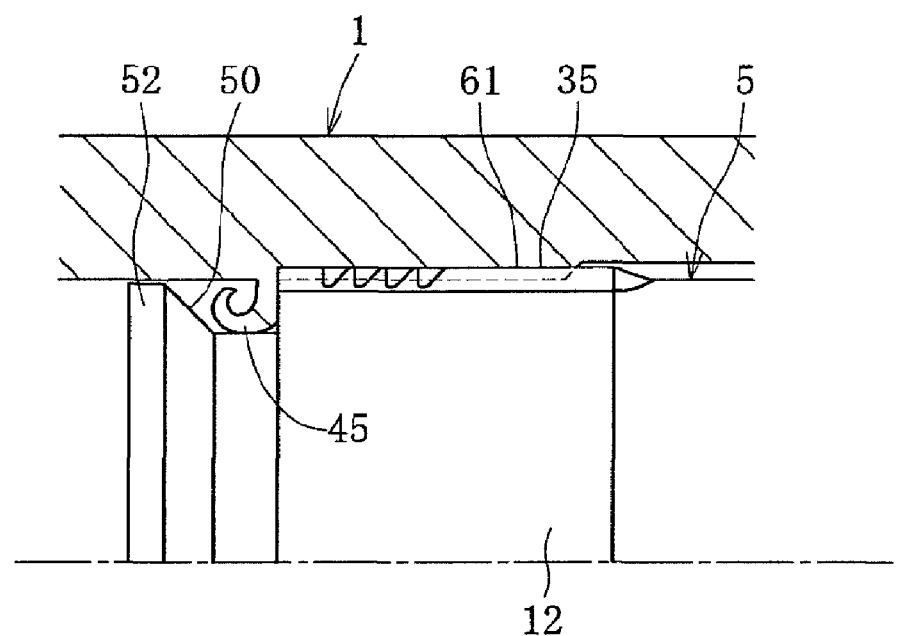
FIG. 8 is an enlarged cross-sectional view of a main part of the wheel bearing device in FIG. 7.
Figure 9:
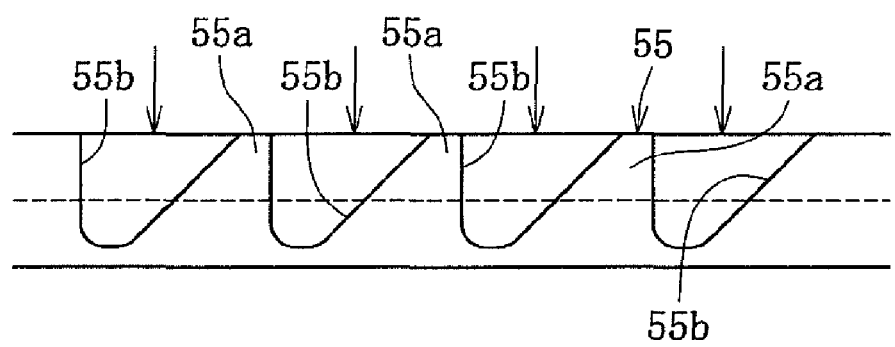
FIG. 9 is a simplified diagram of a projection and recess mating structure of the wheel bearing device in FIG. 7.

As shown in FIG. 7, when the stem shaft 12 including saw tooth sections 55 is press-fitted into the hole section 22 of the stem shaft 12, as shown in FIG. 8, the recesses 36 are formed on the hub wheel 1 side by the projections 35 on the stem shaft 12 side while being centered by the shoulder section 52, and the protruding section 45 is formed. The protruding section 45 is housed within the pocket section 50 while being curled.

During press-fitting, the saw tooth section 55 wedge into a bottom section of the recess 36 formed on the hub wheel 1 side. In other words, although the hole section 22 that has increased in diameter during press-fitting has a widened diameter, the diameter contracts to return to its original state when press-fitting is completed. Therefore, a pressing force (diameter contracting force) is applied to the saw tooth sections 55 from the inner diameter surface side of the hole section 22 of the hub wheel 1, as indicated by arrows in FIG. 9. The projections 55a of the saw tooth section 55 wedge into the inner diameter surface of the hole section 22 of the hub wheel 1.

In this way, as a result of the saw tooth sections 55 being provided on the projection 35 side, the saw tooth sections 55 (in other words, the plurality of projections 55a) are wedged along the axial direction when press-fitting is performed. As a result of the wedging, a dislocation stopper can be configured for stopping dislocation in the axial direction of the outer joint component 5 of the constant velocity universal joint from the hub wheel 1. As a result, a stable connection state can be maintained. Quality of the wheel bearing device can be enhanced. Moreover, because the dislocation stopper can be configured by the saw tooth sections 55, screw-tightening, such as that which is conventionally required, can be omitted. Therefore, a screw section that projects from the hole section 22 of the hub wheel 1 is not required to be formed on the stem shaft 12. Weight reduction can be achieved. In addition, the screw tightening operation can be omitted, and assembly workability can be enhanced.

Figure 10A:
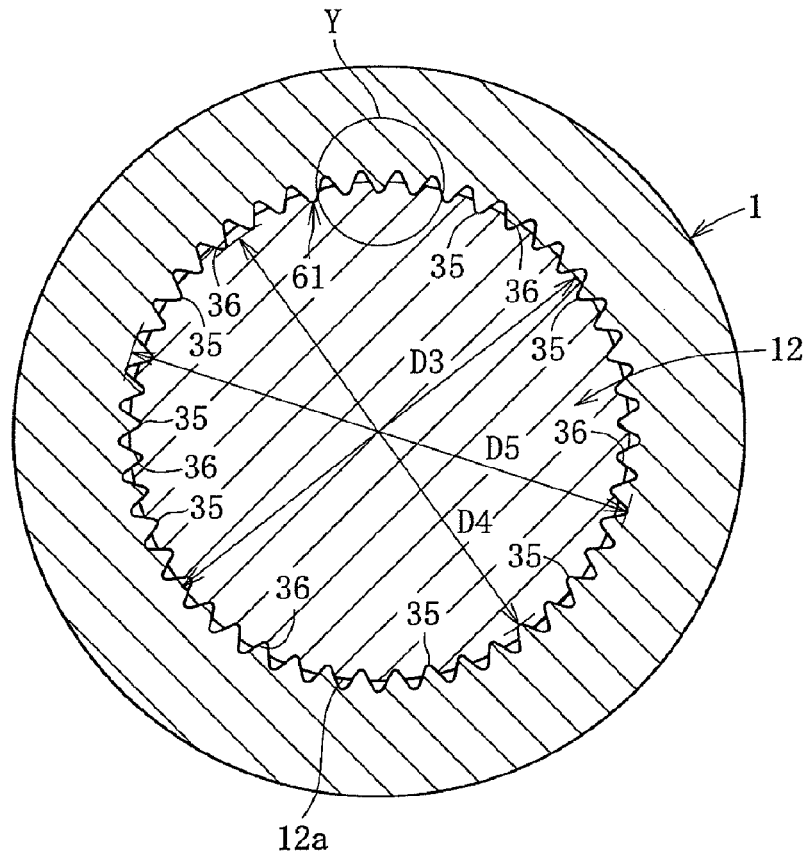
FIG. 10a is an enlarged cross-sectional view of a projection and recess mating structure of a wheel bearing device according to a fourth embodiment of the present invention.
Figure 10B:
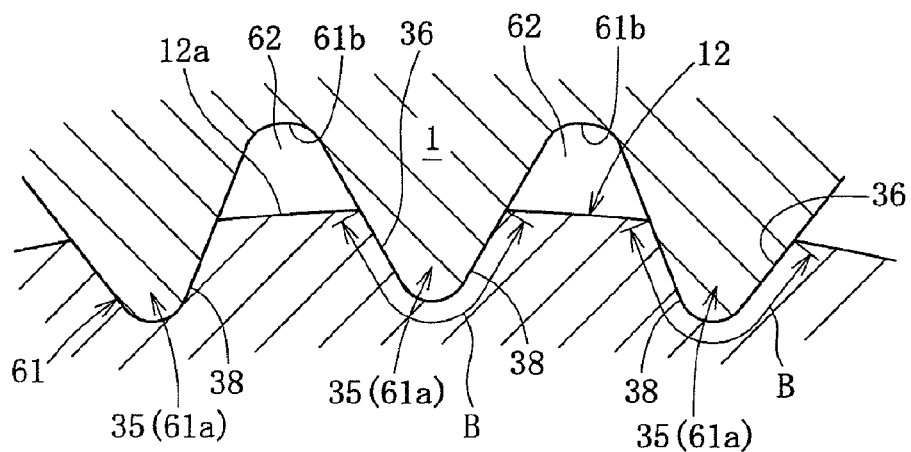

According to each embodiment, the spline 41 configuring the projections 35 is formed on the stem shaft 12 side. The hardening treatment is performed on the spline 41 of the stem shaft 12, and the inner diameter surface of the hub wheel 1 is unhardened (raw material). On the other hand, as shown in FIG. 10a and FIG. 10b according to a fourth embodiment, a spline 61 (configured by projecting strips 61a and recessing strips 61b) on which the hardening treatment is performed can be formed on the inner diameter surface of the hole section 22 of the hub wheel 1. The hardening treatment is not performed on the stem shaft 12. The spline 61 can also be formed by various processing methods, such as a broaching process, a cutting process, a pressing process, and an extracting process, which are conventionally known means. Various types of heat treatment, such as high-frequency hardening, and carburizing and quenching, can be used for the thermally hardening process.

In this instance, the projection direction intermediate area of the projection 35 corresponds to the recess forming surface (outer diameter surface of the stem shaft 12) before recess formation. In other words, a diameter dimension (minimum diameter dimension) D4 of a circle connecting the peaks of the projections 35 serving as the projections 61a of the spline 61 is set to be smaller than an outer diameter dimension D3 of the stem shaft 12. In addition, a diameter dimension (inner diameter dimension of a mating hole inner diameter surface between projections) D5 of a circle connecting the bottoms of the recesses 61b of the spline 61 is set to be greater than the outer diameter dimension D3 of the stem shaft 12. In other words, D4<D3<D5.

When the stem shaft 12 is press-fitted into the hole section 22 of the hub wheel 1, the projections 35 on the hub wheel 1 side can form the recesses 36 with which the projections 35 mate on the outer circumferential surface of the stem shaft 12. As a result, a mating state can be configured in which the overall recess mating area 38 of the projection 35 on the hub wheel 1 side is in close contact with the corresponding recess 36 on the stem shaft 12 side.

Here, the recess mating area 38 of the projection 35 is an area B shown in FIG. 10b. The area is extends from a halfway section to the peak of a peak shape of the cross-section. A gap 62 is formed between the projections 35 adjacent to each other in the circumferential direction, further to the outer diameter side than the outer diameter surface of the stem shaft 12.

In this instance as well, the protruding section 45 is formed by press-fitting. Therefore, the pocket section 50 is preferably provided to house the protruding section 45. Unlike that shown in FIG. 5, the protruding section 45 is formed on the mouth side of the stem shaft 12. Therefore, the pocket section is provided on the hub wheel 1 side.

Even when the projections 35 of the projection and recess mating structure M are formed on the hub wheel 1 side in this way, a shoulder section can be provided on the end section of the stem shaft 12 on the counter-mouth side. An outer diameter dimension of the shoulder section is used for centering when the stem shaft 12 is press-fitted into the hub wheel 1. As a result, press-fitting can be performed with high accuracy. A saw tooth section that functions as a dislocation stopper can be provided on the hub wheel 1 side.

The first to fourth embodiments of the present invention are described above. However, the present invention is not limited to the above-described embodiments. Various modifications can be made. For example, according to the embodiment shown in FIG. 2a and FIG. 2b, the projection 35 of the projection and recess mating structure M has a triangular cross-section. According to the embodiment shown in FIG. 4, the projection 35 has a trapezoidal (Mount Fuji shaped) cross-section. However, various other shapes can be used, such as a semi-circle, a semi-ellipsoid, and a rectangle. The cross-sectional area, amount, circumferential direction pitch, and the like of the projections 35 can be arbitrarily changed. In other words, it is not required that the spline 41 or 61 be formed and the projections (projecting teeth) 41a or 61a of the spline 41 or 61 serve as the projections 35 of the projection and recess mating structure M. A key-like configuration can be used. Alternatively, mating surfaces of curved waveforms can also be formed. In other words, all that is required is that the projections 35 disposed along the axial direction are press-fitted into a partner side, and the projections 35 form the recesses 36 with which the projections 35 mate in close contact on the partner side. In addition, the overall recess mating area 38 of the projection 35 is in close contact with the corresponding recess 36, and rotational torque can be transmitted between the hub wheel 1 and the constant velocity universal joint 3.

The shaft hole 22 of the hub wheel 1 can be an irregularly shaped hole, such as a polygonal hole, in addition to the circular hole. A cross-sectional shape of the end section of the stem shaft 12 to be inserted into the shaft hole 22 can also be irregular, such as a polygon, in addition to a circular cross-section. Therefore, for example, the shaft hole 22 of the hub wheel 1 can be a circular hole, and the cross-sectional shape of an end section 5a of the shaft 5 can be a polygon other than a circle. Edge sections of the polygon can serve as the projections 35.

According to the first to fourth embodiments, the thermally hardening process is performed on the projection 35. The side corresponding to the projections is an unhardened area The hardness of the projections 35 is higher than the area in which the recesses 36 are formed. However, as long as a difference in hardness is achieved, the thermally hardening process can be performed on both sides or on neither side. Moreover, only an end section of the projections 35 at which press-fitting starts when press-fitting is performed is required to be harder than the area in which the recesses 36 are formed. Therefore, the hardness of the entire projection 35 is not required to be high. The gap 40 is formed in FIG. 2a, FIG. 2b, and the like. However, the projections 35 can wedge into the inner diameter surface 37 of the hub wheel 1 down to the recesses between the projections. The difference in hardness between the projection 35 aide and the recess forming surface side on which the recesses are formed by the projections is preferably 30 points or more on the HRC scale, as described above. However, the difference can be less than 30 points as long as the projections 35 can be press-fitted.

The end face (press-fitting starting end) of the projection 35 is a surface perpendicular to the axial direction, according to the above-described embodiments. However, the end face can be tilted at a predetermined angle in relation to the axial direction. In this instance, the end face can be tilted to the counter-projection side from the inner diameter side towards the outer diameter side. Alternatively, the end face can be tilted towards the projection side.

According to the above-described embodiments, the shape of the pocket section 50 is that in which the side face 51b of the circumferential direction groove 51 on the counter-spline side is a tapered surface that widens in diameter from the groove bottom 51c towards the counter-spline side. However, the side face 51b is not required to be a tapered surface. In other words, all that is required is that the protruding section 45 that is formed be housed (stored). Therefore, the dimension of the pocket section 50 is merely required to be that corresponding to the protruding section 45 that is formed.

When the saw tooth sections 55 are provided, in FIG. 7, the saw tooth sections 5 are provided on the axial direction end section (pocket section side) of the spline 41. However, the saw tooth sections 55 can be provided on the opposite side, namely the mouth section 11 side. Alternatively, the saw tooth sections 55 can be provided in an axial direction intermediate section of the spline 41. Alternatively, the saw tooth sections 55 can be provided over the overall axial direction length of the spline 41. The number and shape of the projections (projecting teeth) 55a in each saw tooth section 55 can be arbitrarily changed. The saw tooth section 55 can be provided on the projections 35 over the overall circumferential direction periphery. Alternatively, the saw tooth section 55 can be provided on arbitrary projections 35 among the projections 35 over the overall circumferential direction periphery. According to the embodiment, the saw tooth sections 55 are provided on the projections 41a of the spline 41 configuring the projections 35. However, the saw tooth sections 55 can be provided on the recesses 41b of the spline 41.

Moreover, small recesses disposed at a predetermined pitch along the circumferential direction can be provided on the inner diameter surface 37 of the hole section 22 of the hub wheel 1. The small recesses are required to be smaller than the dimension of the recesses 36. As a result of the small recesses being provided in this way, facilitation of press-fitting of the projections 35 can be enhanced. In other words, as a result of the small recesses being provided, the volume of the protruding section 45 formed when the projections 35 are press-fitted can be reduced. Press-fitting resistance can be reduced. In addition, because the protruding section 45 can be reduced, the dimension of the pocket section 50 can be reduced. Processability of the pocket section 50 and strength of the stem shaft 12 can be improved. Various shapes, such as a semi-ellipsoid and a rectangle can be used for the small recesses. The number of small recesses can also be set arbitrarily.

According to the embodiment shown in FIG. 1 and the like, preload is applied to the inner ring 24 by the end section of the hub wheel 1 being crimped. However, the preload can be applied by a male screw being provided on a small-diameter stepped section tip on an inboard side of the hub wheel 1, and a nut being tightened around the male screw. Moreover, a roller can be used as the rolling element 30 of the bearing 2. According to the above-described embodiments, a third generation wheel bearing device is indicated. However, the wheel bearing device can be a first generation, a second generation, or a fourth generation. When the projections 35 are press-fitted, the side on which the recesses 36 are formed can be fixed and the side on which the projections 35 are formed can be moved. Alternatively, the side on which the projections 35 are formed can be fixed and the side on which the recesses 36 are formed can be moved. Alternatively, both sides can be moved. In the constant velocity universal joint 3, the inner ring 6 and the shaft 10 can be integrated by the projection and recess mating structure M described according to each of the above-described embodiments.

Next, a fifth embodiment and a sixth embodiment configured such that a bearing section is minimally affected by hoop stress from a tightly-engaged section will be described with reference to FIG. 11 (fifth embodiment) and FIG. 12 (sixth embodiment). Configurations of a hub wheel 210 and a constant velocity universal joint 203 according to the fifth and sixth embodiments are similar to those of the hub wheel 1 and the constant velocity universal joint 3 according to the first to fourth embodiments. In other words, the hub wheel 210 includes a shaft section 216 and a flange 217 provided such as to project from the shaft section 216. A wheel attaching flange 217 for attaching a wheel is provided on an outer circumferential surface of the hub wheel 210. A bolt attaching hole 218 is provided on the wheel attaching flange 217 along the circumferential direction. A hub bolt 225 is attached to the bolt attaching hole 218. In other words, a brake rotor and a wheel are overlapped on an end face of the wheel attaching flange 217 and fixed by the hub bolt 225. An inner diameter surface of the hub wheel 210 includes a tapered surface 254, a small diameter section 255, a tapered surface 256, and a large diameter section 257. The tapered surface 254 decreases in diameter towards the counter-flange side. The small diameter section 255 continues from the tapered surface 254. The tapered surface 256 increases in diameter from the small diameter section 255 towards the counter-flange side. The large diameter section 257 continues from the tapered surface 256. A notched section 258 is provided on a flange-side end face 263 of the hub wheel 210.

Figure 11:
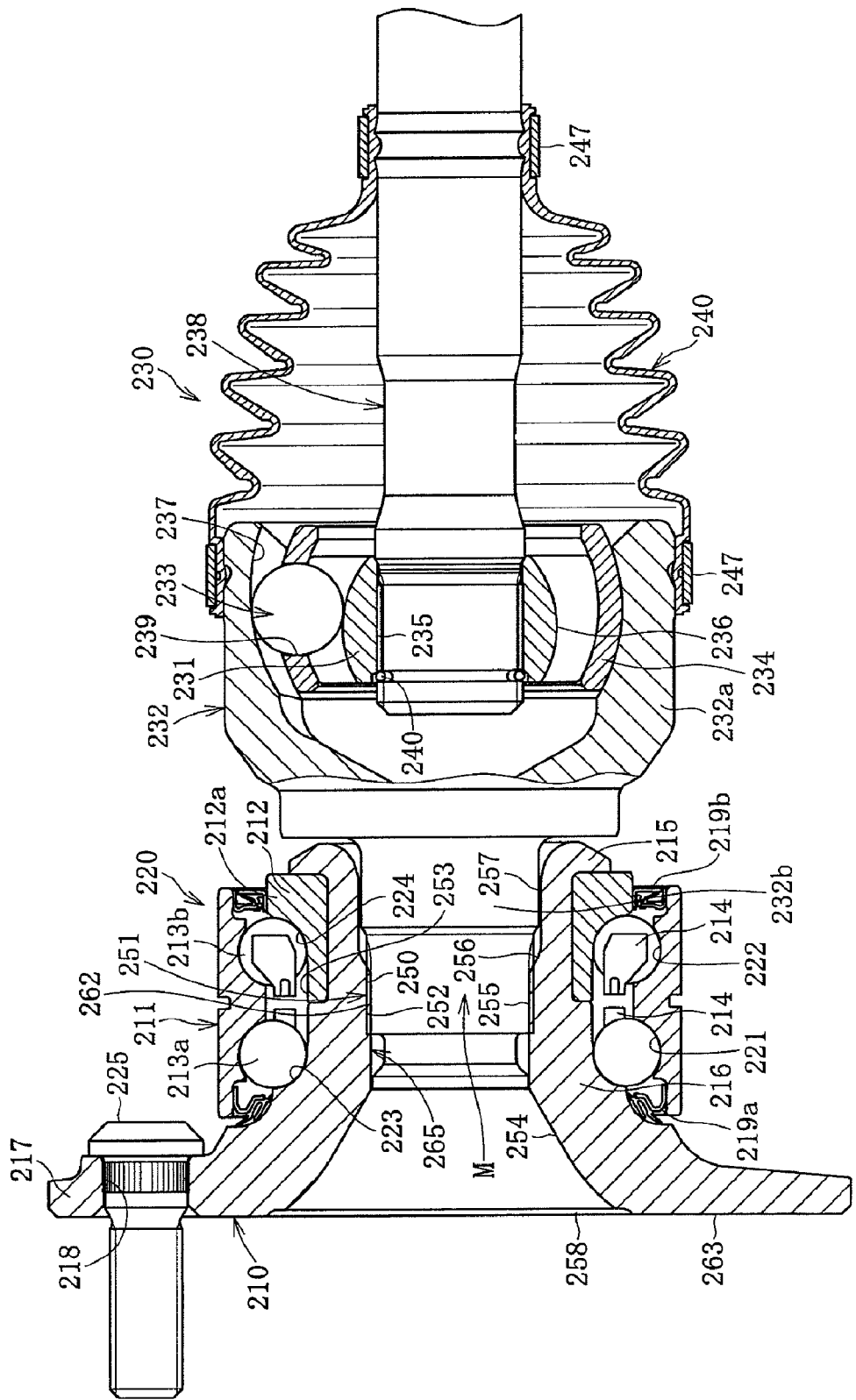
FIG. 11 is a cross-sectional view of a driving wheel bearing device according to a fifth embodiment of the present invention.
Figure 12:
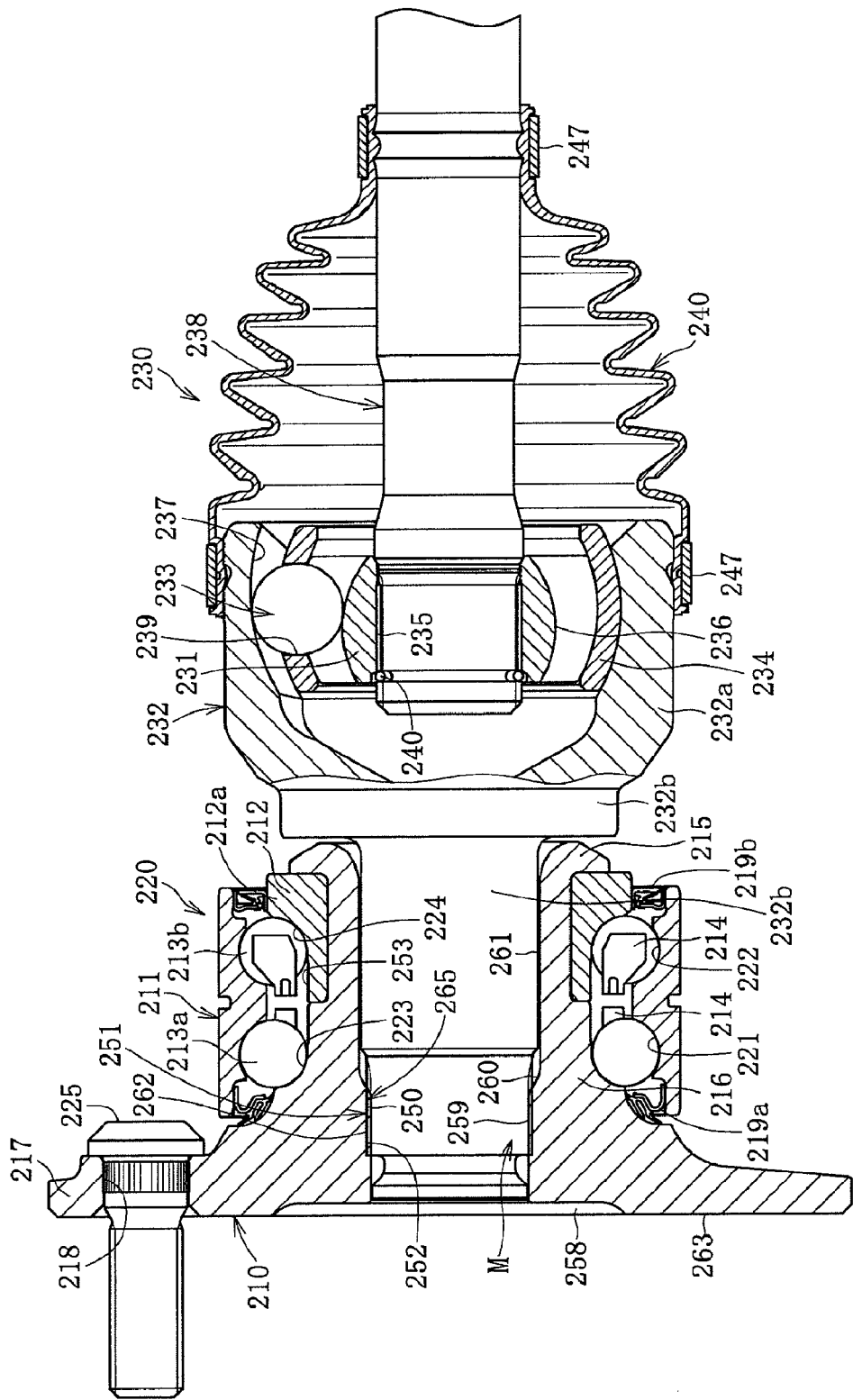
FIG. 12 is a cross-sectional view of a driving wheel bearing device according to a sixth embodiment of the present invention.
Figure 13:
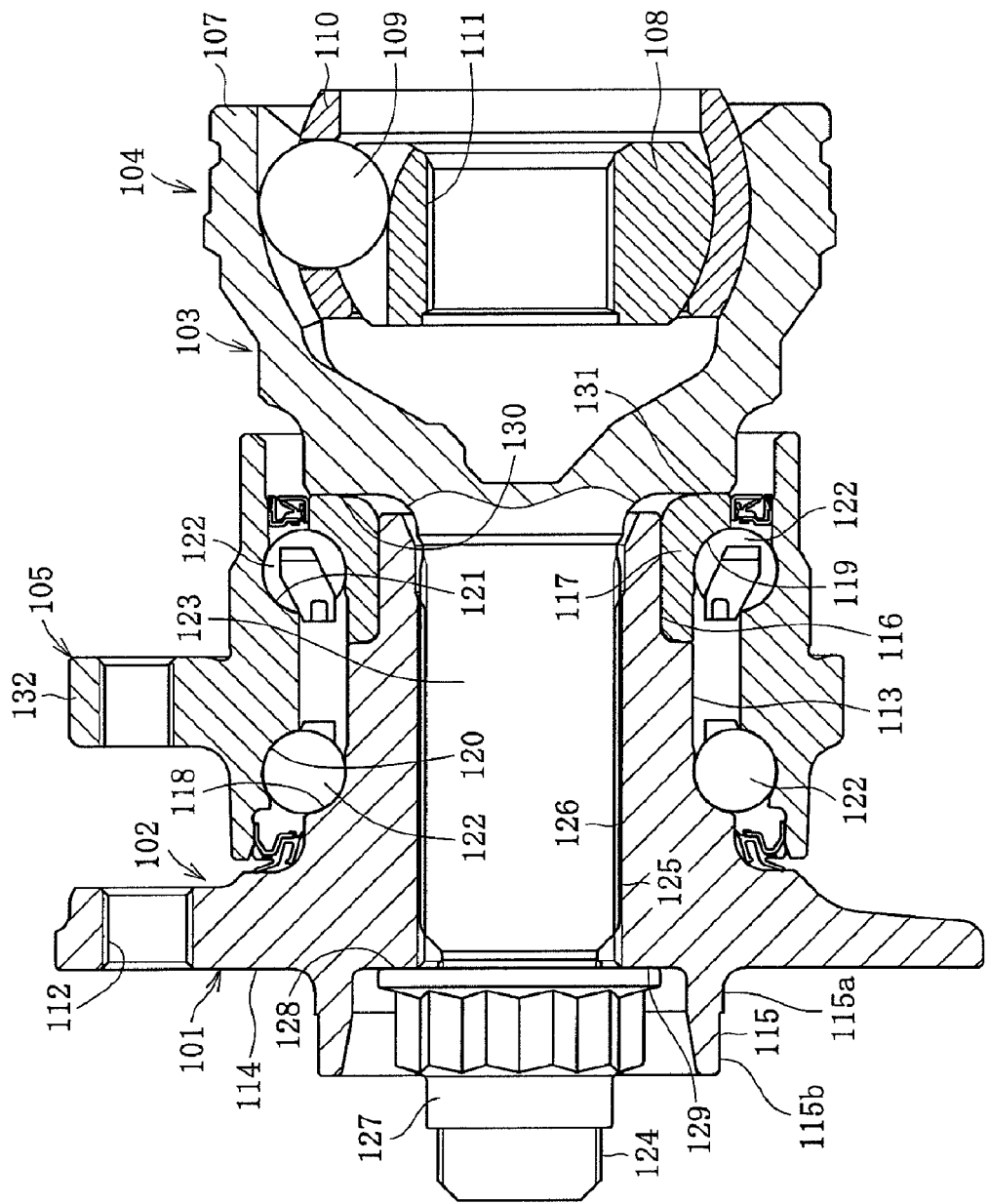
FIG. 13 is a cross-sectional view of a conventional wheel bearing device.

In FIG. 11 and FIG. 12, a bearing structure section 220 includes an inner member (inner ring) 212, an outer member (outer ring) 211, an outboard side rolling element (ball) 213a, an inboard side rolling element (ball) 213b, and outboard side and inboard side cages 214. The inner ring 212 is fixed such as to be fitted onto the hub wheel 210. The outer ring 211 is disposed around the hub wheel 210 and the inner ring 212. The rolling element 213a is interposed between the outer ring 211 and the hub wheel 210. The rolling element 213b is interposed between the outer ring 211 and the inner ring 212. The cages 214 include pockets for holding the rolling element 213a and the rolling element 213b. A side serving as an outer side of a vehicle in a state in which the wheel bearing device is assembled to a vehicle, such as an automobile, is the outboard side. A side serving as an inner side of the vehicle in the state in which the wheel bearing device is assembled to a vehicle, such as an automobile, is the inboard side.

Double rows of outer raceway surfaces 221 and 222 are provided on an inner periphery of the outer ring 211. The first outer raceway surface 221 of the outer ring 211 and a first inner raceway surface 223 of the hub wheel 210 face each other. The second outer raceway surface 222 of the outer ring 211 and a second inner raceway surface 224 of the inner ring 212 face each other. The rolling elements (balls) 213a and 213b are interposed therebetween. Sealing components 219a and 219b are press-fitted and fixed onto inner circumferential surfaces on both ends of the outer ring 211 in the axial direction.

In the inner ring 212, a counter-flange side end section of the shaft section 216 of the hub wheel 210 is crimped. The inner ring 212 is fastened onto the shaft section 216 by the crimped section 215.

The constant velocity universal joint 230 includes an outer joint component 232, an inner joint component 231, a plurality of balls 233, and a cage 234 as main components. The inner joint component is disposed on the inner side of the outer joint component 232. The balls 233 are interposed between the outer joint component 232 and the inner joint component 231, and transmit torque. The cage 234 is interposed between the outer joint component 232 and the inner joint component 231, and holds the balls 233.

A plurality of track grooves 236 are formed on an outer circumferential surface (convex spherical outer circumferential surface) of the inner joint component 231. A shaft 238 is inserted into a center hole (inner diameter hole) 235 of the inner joint component 231 and spline-engaged. Torque transmission between the shaft 238 and the inner joint component 231 can be performed as a result of the spline engagement. A stopper ring 240 is fitted onto an end section of the shaft 238 to prevent shaft dislocation.

The outer joint component 232 includes a mouth section 232a and a stem shaft 232b. The mouth section 232a houses the inner joint component 231, the vase 234, and the torque transmitting balls 233. The stem shaft 232b extends integrally from the mouth section 232a in the axial direction. A same number of track grooves 237 as the number of track grooves 236 on the inner joint component 231 are formed on the inner circumferential surface (cylindrical inner circumferential surface) of the outer joint component 232. The plurality of balls 233 that transmit torque are placed between the track grooves 237 of the outer joint component 232 and the track grooves 236 of the inner joint component 231. The cage 234 is disposed between the inner joint component 231 and the outer joint component 232. The balls 233 are held within pockets 239 of the cage 234. A large diameter section of a boot 240 is fixed onto an opening side of the mouth section 232a, via a boot band. A small diameter section of the boot 240 is fixed onto an outer circumferential surface of the shaft 238.

The driving wheel gearing device described above includes a projection and recess mating structure M that integrates the hub wheel 210 and the stem shaft 232b of the outer joint component 232 of the constant velocity universal joint 230 fitted into a hole section 265 of the hub wheel 210. The projection and recess mating structure M includes, for example, a projection extending in the axial direction provided on the end section of the stem shaft 232b and a recess formed on the inner diameter surface of the hole section 265 of the hub wheel 210. An overall recess mating area of the projection is in close contact with the corresponding recess. In other words, a plurality of projections are disposed at a predetermined pitch along the circumferential direction on an outer circumferential surface of the stem shaft 232b on a counter-mouth section side. A plurality of recesses with which the projections mate are formed along the circumferential direction on an inner diameter surface of a stem shaft fitting hole of the hole section 265 of the hub wheel 210. In other words, the projections and the recesses that mate with the projections are tightly fitted along the overall periphery in the circumferential direction. The projections and the recesses of another partner component with which the projections mate are in close contact over an overall tightly-section 250.

Therefore, the hub wheel 210 and the stem shaft 232b of the outer joint component 232 of the constant velocity universal joint 230 can be connected by the projection and recess mating structure M. At this time, the end section of the hub wheel 210 on the joint side is crimped, and preload is applied to the inner member (inner ring) 212 at the crimped section 215.

Next an assembly method of the hub wheel 210 and the constant velocity universal joint 230 in the driving wheel bearing device will be described. As described above, before the hub wheel 210 and the outer joint component 232 of the constant velocity universal joint 230 are connected, the outer-flange side end section of the shaft section 216 of the hub wheel 210 is crimped. The inner ring 212 is fastened onto the shaft section 216 by the crimped section 215. As a result, the preload (preparatory preload) is applied to the inner ring 212.

A hardened layer is formed on the outer diameter section of the stem shaft 232b over the overall periphery by high-frequency hardening and the like. A spline 262 is formed on a mating area (axial direction intermediate area of the stem axis 232b) as recessing and projections along the circumferential direction. Therefore, a hardening treatment is performed on the projections of the spline 262. The projections serve as projections of the projection and recess mating structure M. An inner diameter surface of the hub wheel 210 is unhardened. Therefore, the mating area (namely the spline) side is harder than a mated area 252 (namely the inner diameter surface of the small diameter section 255 of the hub wheel 210).

The stem shaft 232b is press-fitted into the hub wheel 210 from the counter-flange side. At this time, the spline 262 of the stem shaft 232b is hardened. The inner diameter surface of the hub wheel 210 remains a raw material that has not been hardened Therefore, the shape of the spline 262 of the stem shaft 232b is transferred onto the inner diameter surface of the hub wheel 210. In other words, when the stem shaft 232b is press-fitted into the hole section 265 of the hub wheel 210, the projections wedge into the inner diameter surface of the hole section 265 of the hub wheel 210. The projections form the recesses with which the projections mate, along the axial direction. As a result, the inner circumferential surface of the hub wheel 210 and the outer circumferential surface of the stem shaft 232b are integrated. The hub wheel 210 and the stem shaft 232b are integrated. In other words, when the projections of the spline 262 are press-fitted, the shaft section 216 of the hub wheel 210 is elastically deformed in a radial direction. Preload equivalent to an amount of elastic deformation is applied to the flanks of the projections. Therefore, the overall recess mating area of the projection of the spline 262 is in close contact with the recess. In this way, the stem shaft 232b and the hub wheel 210 are integrated. The close-contact mating section 250 in this instance is disposed between the raceway surface 224 (raceway surface on the inner ring 12) on the inboard side of the wheel bearing device and the raceway surface (raceway surface on the hub wheel 210) on the outboard side.

In the present invention, the stem shaft 232b of the constant velocity universal joint is inserted into the inner circumferential surface of the hub wheel 210. The shape of the mating area 251 is transferred onto the mated area 252 having a lower hardness than the mating area 251. As a result, the stem shaft 232b and the hub wheel 210 can be integrated. Therefore, bolts and the like are not required to connect the stem shaft 232b and the hub wheel 210.

In addition, according to the fifth embodiment shown in FIG. 11, the close-contact mating section 250 between the stem shaft 232b and the hub wheel 210 is disposed between the raceway 224 on the inboard side and the raceway 223 on the outboard side. As a result, an increase in diameter of the hub wheel 210 outside of an area of the close-contact mating section 250 can be minimized during assembly of the stem shaft 232b. Therefore, hoop stress in the raceway surfaces 223 and 224 on the outboard side and the inboard side, an inner ring shoulder section 212a, and the like that are excluded from the area of the close-contact mating section 250 can be minimized. As a result, problems, such as decrease in rolling fatigue life, formation of cracks, stress corrosion cracking and the like, occurring in the bearing can be prevented. A high-quality bearing can be provided. Because the projection and recess mating structure M can be formed by the stem shaft 232b being press-fitted into the inner circumferential surface of the hub wheel 210, a nut fastening operation is not required to be performed when the stem shaft 232b and the hub wheel 210 are connected. Therefore, assembly operation can be facilitated. Cost related to the assembly operation can be reduced, and weight can be reduced.

According to the sixth embodiment in FIG. 12, the inner diameter surface of the hub wheel 210 includes a small diameter section on a counter-constant velocity universal joint side, a large diameter section 261 on the constant velocity universal joint side, and a tapered section 260 between the large diameter section 261 and the small diameter section 259. Thermally hardening process is not performed on the inner diameter surface of the hub wheel 210.

At this time, the spline 262 on the stem shaft 232b is hardened. The inner diameter surface of the hub wheel 210 remains a raw material that has not been hardened. Therefore, the shape of the spline 262 is transferred onto the inner diameter surface of the hub wheel 210. In other words, when the stem shaft 232b is press-fitted into the hole section 265 of the hub wheel 210, the projections wedge into the inner diameter surface of the hole section 265 of the hub wheel 210. The projections form the recesses with which the projections mate, along the axial direction. As a result, the inner circumferential surface of the hub wheel 210 and the outer circumferential surface of the stem shaft 232b are integrated. The hub wheel 210 and the stem shaft 232b are integrated. The close-contact mating section 250 in this instance is disposed closer to the outboard side than the outboard side end section of the raceway surface 223 on the outboard side.

Therefore, the wheel bearing device according to the sixth embodiment in FIG. 12 achieves effects that are similar to those of the wheel bearing device according to the fifth embodiment in FIG. 11. In particular, the close-contact mating section 250 between the stem shaft 232b and the hub wheel 210 is disposed closer to the outboard side than the outboard side end section of the raceway surface 223 on the outboard side. As a result, an increase in diameter of the hub wheel 210 outside of the area of the close-contact mating section 250 can be minimized during assembly of the stem shaft 232b. Therefore, hoop stress in the raceway surfaces 223 and 224 on the outboard side and the inboard side, an area 253 between raceways, the inner ring shoulder section 212a, and the like that are excluded from the area of the close-contact mating section 250 can be minimized. Therefore, a bearing can be provided that is higher in quality than that of the driving wheel bearing device according to the first embodiment.

The embodiments of the present invention are described above. However, the present invention is not limited to the above-described embodiments. Various modifications can be made. For example, according to the fifth embodiment in FIG. 11 and the sixth embodiment in FIG. 12, the rolling elements 213a and 213b are configured by balls. However, conical rollers can be used as the rolling elements. The driving wheel bearing device shown in FIG. 11 is a third generation, in which the raceway surface 223 is directly formed on the outer periphery of the hub wheel 210. However, the driving wheel bearing device can be a first generation or a second generation in which a pair of inner rings are attached (press-fitted) to the hub wheel 210. Alternatively, the driving wheel bearing device can be a fourth generation in which raceway surfaces are respectively formed on the outer periphery of the hub wheel 210 and the outer joint component 232 of the constant velocity universal joint.

A female-side cylindrical hole (hub wheel 210) can be hardened by quenching. A male side (stem shaft 232b) being press-fitted into the cylindrical hole, thereby connecting the hub wheel 210 and the stem shaft 232b. In this instance, recessing and projections (spline) can be formed on the inner circumferential surface of the hub wheel 210 in advance. The recessing and projections can be hardened by quenching, and wedged into the outer circumferential surface of the stem shaft 232b, thereby forming the projection and recess mating structure M.

As a method of performing thermally hardening process, high-frequency hardening is performed according to the above-described embodiments. However, other processing methods, such as carburizing and quenching, can also be used. The spline formed on the stem shaft 232b and the hub wheel 210 can be formed by various processing methods, such as a rolling process, a cutting process, a pressing process, and an extracting process, which are conventionally known means. The recessing and projections provided on the side to be hardened are not required to be the spline. In other words, all that is required is that projections that wedge into the partner side be provided. Therefore, the shape, amount and the like of the projections can be set arbitrarily.

The invention claimed is:

1. A wheel bearing device including an outer member having a plurality of outer raceway surfaces on an inner periphery, a plurality of inner raceway surfaces opposing the outer raceway surfaces, a plurality of rows of rolling elements disposed between the opposing outer raceway surfaces and inner raceway surfaces, a hub wheel adapted to be attached to a wheel, and a constant velocity universal joint, in which a stem shaft of an outer joint component of the constant velocity universal joint fitted into a hole section of the hub wheel is integrated with the hub wheel by a projection and recess mating structure, wherein:

the projection and recess mating structure includes a projection extending in an axial direction and provided on one of an outer diameter surface of the stem shaft of the outer joint component and an inner diameter surface of the hole section of the hub wheel, and a recess provided on another of the outer diameter surface of the stem shaft of the outer joint component and the inner diameter surface of the hole section of the hub wheel and mating in close contact with an overall recess mating area, the recess mating area being an area of the projection extending from a halfway section to a peak of a peak-shaped cross-section.

2. The wheel bearing device according to claim 1, wherein a maximum diameter dimension of an arc connecting peaks of a plurality of the projections is greater than an inner diameter dimension of a stem shaft fitting hole of the hub wheel, and a minimum outer diameter dimension of a stem shaft outer diameter surface between the projections is smaller than the inner diameter dimension of the stem shaft fitting hole of the hub wheel.

3. The wheel bearing device according to claim 1, wherein a diameter dimension of an arc connecting peaks of a plurality of the projections of the hole section of the hub wheel is smaller than an outer diameter dimension of the stem shaft of the outer joint component, and an inner diameter dimension of an inner diameter surface of the hole section between the projections is greater than the outer diameter dimension of the stem shaft of the outer joint component.

4. The wheel bearing device according to claim 1, wherein the projection and recess mating structure is configured by the projection extending in the axial direction and provided on the one of the outer diameter surface of the stem shaft of the outer joint component and the inner diameter surface of the hole section of the hub wheel being inserted into the other of the outer diameter surface of the stem shaft of the outer joint component and the inner diameter surface of the hole section of the hub wheel along the axial direction, and the projection forming the recess mating with the projection in close contact with the other of the outer diameter surface of the stem shaft of the outer joint component and the inner diameter surface of the hole section of the hub wheel.

5. The wheel bearing device according to claim 4, wherein the projection and recess mating structure is configured by the projection of the projection and recess mating structure being provided on the outer diameter surface of the stem shaft of the outer joint component of the constant velocity universal joint, a hardness of at least an axial direction end section of the projection being higher than that of an inner diameter section of the hole section of the hub wheel, and the recess that mates in close contact with the projection being formed on the inner diameter surface of the hole section of the hub wheel by the projection as a result of the stem shaft being press-fitted into the hole section of the hub wheel from an axial direction end section side of the projection.

6. The wheel bearing device according to claim 5, wherein a pocket section for housing a protruding section formed as a result of the recess being formed by press-fitting is provided on the stem shaft.

7. The wheel bearing device according to claim 6, wherein the pocket section for housing the protruding section is provided on a press-fitting starting end side of the projection of the stem shaft, and a shoulder section for centering with the hole section of the hub wheel is provided on an axial direction counter-projection side of the pocket section.

8. The wheel bearing device according to claim 4, wherein the projection and recess mating structure is configured by the projection of the projection and recess mating structure being provided on the inner diameter surface of the hole section of the hub wheel, a hardness of at least an axial direction end section of the projection being higher than that of an outer diameter section of the stem shaft of the outer joint component of the constant velocity universal joint, and the recess that mates in close contact with the projection being formed on the outer diameter surface of the stem shaft of the outer joint component by the projection as a result of the projection on a hub wheel side being press-fitted into the stem shaft of the outer joint component from an axial direction end section side of the projection.

9. The wheel bearing device according to claim 8, wherein a pocket section for housing a protruding section formed as a result of the recess being formed by press-fitting is provided on the inner diameter surface of the hole section of the hub wheel.

10. The wheel bearing device according to claim 1, wherein a circumferential direction thickness of a projection direction intermediate area of the projection is smaller than a circumferential direction dimension at a position corresponding to an intermediate area between an adjacent pair of the projections in a circumferential direction.

11. The wheel bearing device according to claim 1, wherein a sum of circumferential direction thicknesses of projection direction intermediate areas of a plurality of the projections is smaller than a sum of circumferential direction thicknesses of projections on a partner side at positions corresponding to intermediate areas, the projections on the partner side engaging with the projections adjacent in a circumferential direction.

12. The wheel bearing device according to claim 1, wherein a saw tooth section is provided on a projection side of the projection and recess mating structure.

13. The wheel bearing device according to claim 1, wherein the outer joint component of the constant velocity universal joint includes a mouth section in which an inner joint component is included and the stem shaft provided such as to project from a bottom section of the mouth section, in which an end section of the hub wheel is crimped and preload is applied to an inner ring of a roller bearing fitted onto the hub wheel, and the mouth section is in a non-contacting state with the hub wheel.

14. The wheel bearing device according to claim 1, wherein one of the inner raceway surfaces opposing the outer raceway surfaces and a cylindrical small-diameter stepped section are formed on an outer periphery of the hub wheel, another of the inner raceway surfaces opposing the outer raceway surfaces is formed on an outer periphery of an inner ring fitted onto the cylindrical small-diameter stepped section, and the projection and recess mating structure is disposed in a position avoiding a position directly below at least the other of the inner raceway surfaces of the inner ring.

15. The wheel bearing device according to claim 1, wherein the projection and recess mating structure is disposed in a position avoiding positions directly below the inner and outer raceway surfaces.

16. The wheel bearing device according to claim 1, wherein the projection and recess mating structure is disposed between a pair of the inner and outer raceway surfaces on an inboard side and a pair of the inner and outer raceway surfaces on an outboard side.

17. The wheel bearing device according to claim 1, wherein the projection and recess mating structure is disposed closer to an outboard side than an outboard side end section of a pair of the inner and outer raceway surfaces toward the outboard side.

18. A wheel bearing device including an outer member having a plurality of outer raceway surfaces on an inner periphery, a plurality of inner raceway surfaces opposing the outer raceway surfaces, a plurality of rows of rolling elements disposed between the opposing outer raceway surfaces and inner raceway surfaces, a hub wheel adapted to be attached to a wheel, and a constant velocity universal joint, in which a stem shaft of an outer joint component of the constant velocity universal joint fitted into a hole section of the hub wheel is integrated with the hub wheel by a projection and recess mating structure, wherein:

the projection and recess mating structure includes a projection extending in an axial direction and provided on one of an outer diameter surface of the stem shaft of the outer joint component and an inner diameter surface of the hole section of the hub wheel, a recess provided on another of the outer diameter surface of the stem shaft of the outer joint component and the inner diameter surface of the hole section of the hub wheel and mating in close contact with an overall recess mating area, the recess mating area being an area of the projection extending from a halfway section to a peak of a peak-shaped cross-section, and a protruding section from the recess formed as a result of the recess being formed.

19. An assembly method for a wheel bearing device including an outer member having a plurality of outer raceway surfaces on an inner periphery, a plurality of inner raceway surfaces opposing the outer raceway surfaces, a plurality of rows of rolling elements disposed between the opposing outer raceway surfaces and inner raceway surfaces, a hub wheel adapted be attached to a wheel, and a constant velocity universal joint, in which a stem shaft of an outer joint component of the constant velocity universal joint fitted into a hole section of the hub wheel is integrated with the hub wheel by a projection and recess mating structure, the assembly method comprising:

press-fitting the stem shaft into the hole section of the hub wheel in an axial direction, an outer diameter surface of the stem shaft having a projection extending in the axial direction; and forming a recess in a cylindrical inner diameter surface of the hole section of the hub wheel during the press-fitting by cutting the cylindrical inner diameter surface with the projection, wherein the projection and recess mating structure is formed by the projection mating in close contact with the recess.

20. An assembly method for a wheel bearing device including an outer member having a plurality of outer raceway surfaces on an inner periphery, a plurality of inner raceway surfaces opposing the outer raceway surfaces, a plurality of rows of rolling elements disposed between the opposing outer raceway surfaces and inner raceway surfaces, a hub wheel adapted be attached to a wheel, and a constant velocity universal joint, in which a stem shaft of an outer joint component of the constant velocity universal joint fitted into a hole section of the hub wheel is integrated with the hub wheel by a projection and recess mating structure, the assembly method comprising:

press-fitting the stem shaft into the hole section of the hub wheel in an axial direction, an inner diameter surface of the hole section having a projection extending in the axial direction; and forming a recess in a cylindrical outer diameter surface of the stem shaft during the press-fitting by cutting the cylindrical outer diameter surface with the projection, wherein the projection and recess mating structure is formed by the projection mating in close contact with the recess.

* * * * *